(12) United States Patent
Vaidyanathan et al.

(10) Patent No.: US 8,179,816 B1
(45) Date of Patent: May 15, 2012

(54) SYSTEM AND METHOD FOR HIGH RESOLUTION INDOOR POSITIONING USING A NARROWBAND RF TRANSCEIVER

(75) Inventors: Chandra Vaidyanathan, Rockville, MD (US); Gary L Sugar, San Francisco, CA (US); Yohannes Tesfai, Silver Spring, MD (US)

(73) Assignee: Diani Systems, Inc., Ijansville, MD (US)

(*) Notice: Subject to any disclaimer, the term of this patent is extended or adjusted under 35 U.S.C. 154(b) by 0 days.

(21) Appl. No.: 13/286,649

(22) Filed: Nov. 1, 2011

Related U.S. Application Data

(60) Provisional application No. 61/409,123, filed on Nov. 2, 2010, provisional application No. 61/421,641, filed on Dec. 10, 2010.

(51) Int. Cl.
*H04L 1/00* (2006.01)
*H04L 12/26* (2006.01)
*H04J 4/00* (2006.01)
(52) U.S. Cl. .................. 370/252; 370/436; 370/478
(58) Field of Classification Search .................. 370/252, 370/436, 478
See application file for complete search history.

(56) References Cited

U.S. PATENT DOCUMENTS

| | | | | |
|---|---|---|---|---|
| 4,937,822 | A * | 6/1990 | Weddle et al. | 370/436 |
| 7,215,698 | B2 | 5/2007 | Darby et al. | |
| 2005/0050130 | A1 | 3/2005 | Dabak et al. | |
| 2009/0046792 | A1 | 2/2009 | Xu et al. | |

FOREIGN PATENT DOCUMENTS

WO WO 2009/143559 * 12/2009

OTHER PUBLICATIONS

Saberinia et al, "Enhanced Localization in Wireless Personal Area Networks", IEEE Comm. Soc. Globecomm 2004.
Xu et al, "High-Resolution TOA Estimation with Multi-Band OFDM UWB Signals", ICC 2008.
Berger et al, "Precise timing for multiband OFDM in a UWB system", 2006 International Conference on Ultra-Wideband.
Fleury et al, "Channel Parameter Estimation in Mobile Radio Environments Using the SAGE Algorithm" IEEE Journal on Selected Areas in Communications, vol. 17, No. 3, Mar. 1999.
Dardari et al, "Improved lower bounds on time-of-arrival estimation error in UWB realistic channels" 2006.
Guvenc et al, "Ultra-wideband range estimation: theoretical Limits and Practical Algorithms" ACM Transaction on Graphics, Oct. 2008.
ECMA-368, PHY and MAC/PHY Interface spec for MB-OFDM, 3rd Edition / Dec. 2008.
ECMA-369, PHY and MAC/PHY Interface spec for MB-OFDM, 3rd Edition / Dec. 2008.

* cited by examiner

*Primary Examiner* — Ronald Abelson
(74) *Attorney, Agent, or Firm* — John R. Kasha; Kasha Law LLC

(57) ABSTRACT

A sequence of two or more signals representing two or more data packets is transmitted through a wireless channel using a transmitter device. The two or more signals are a result of two or more transmissions that are made sequentially in time at different center frequencies in order to span a desired bandwidth. At least one of the two or more signals includes a physical layer preamble. The sequence of two or more signals is received using a receiver device. A time of arrival of one or more signals of the received sequence is calculated using one or more of the received sequence, the time differences among the two or more transmissions, the different center frequencies, information from the two or more data packets, and any carrier phase differences among the two or more transmissions using the receiver device.

24 Claims, 17 Drawing Sheets

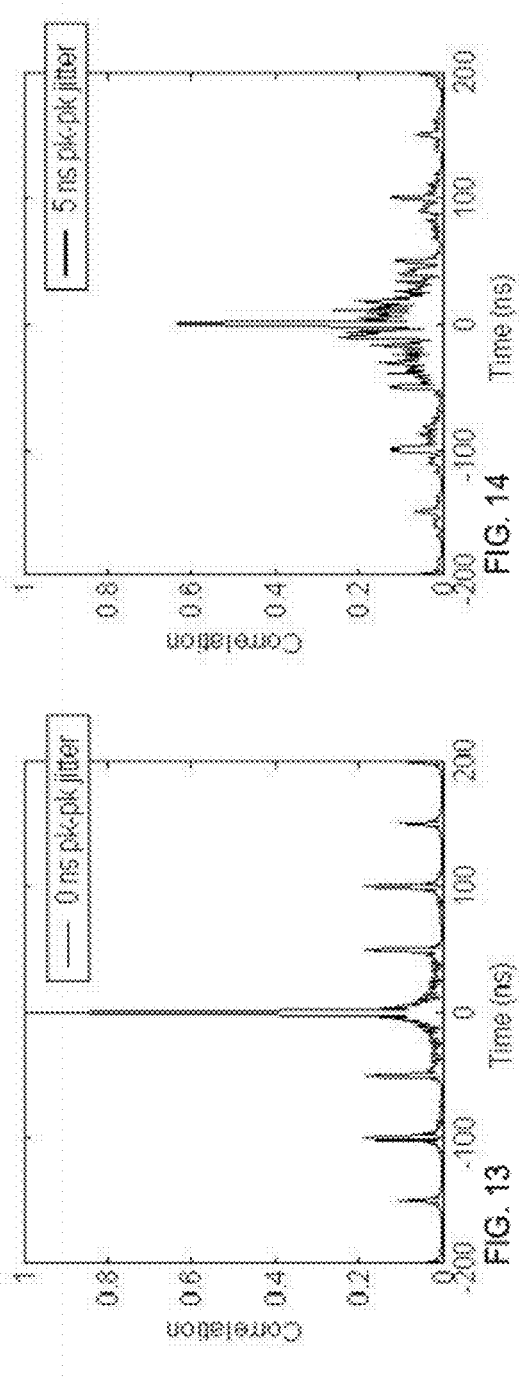
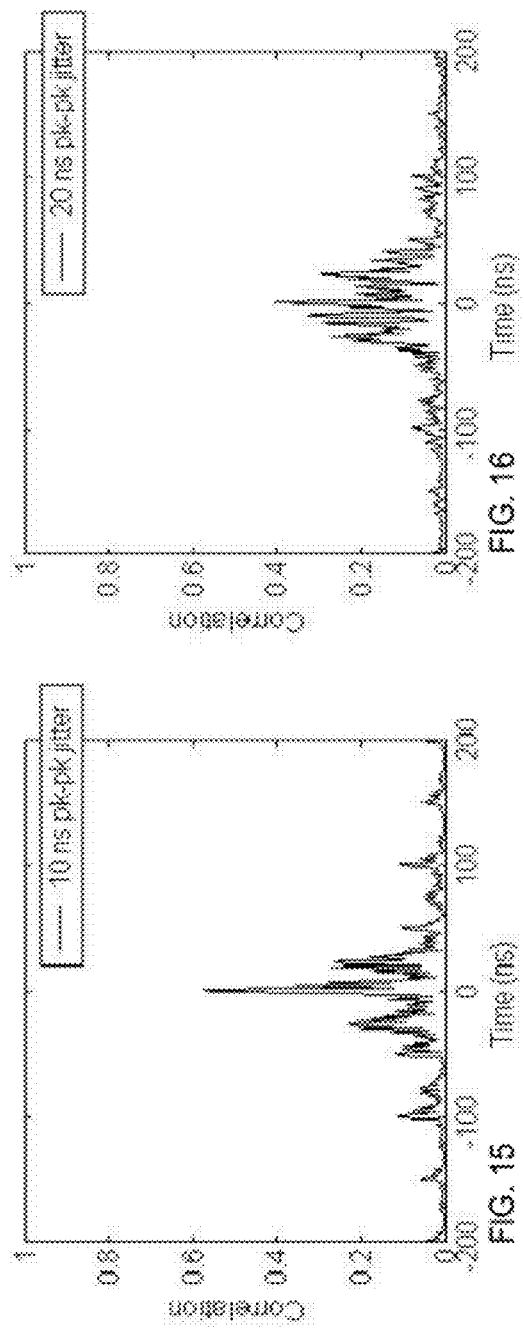
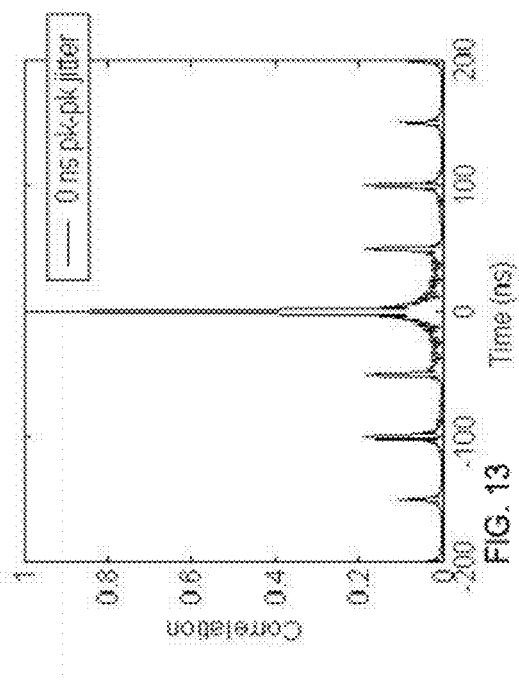
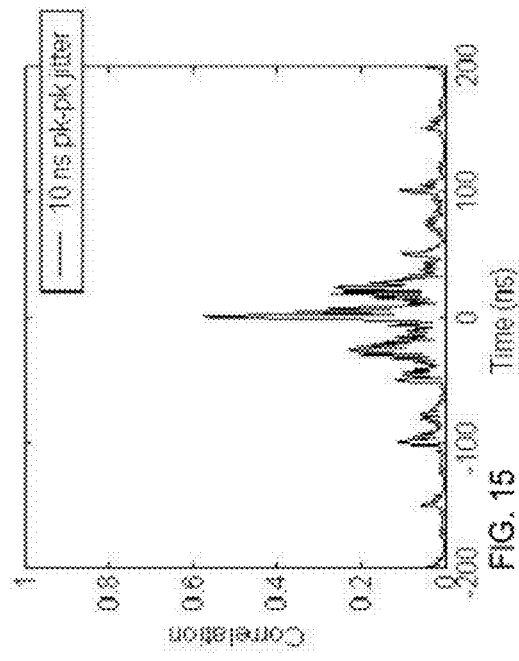
FIG. 13
FIG. 14
FIG. 15
FIG. 16

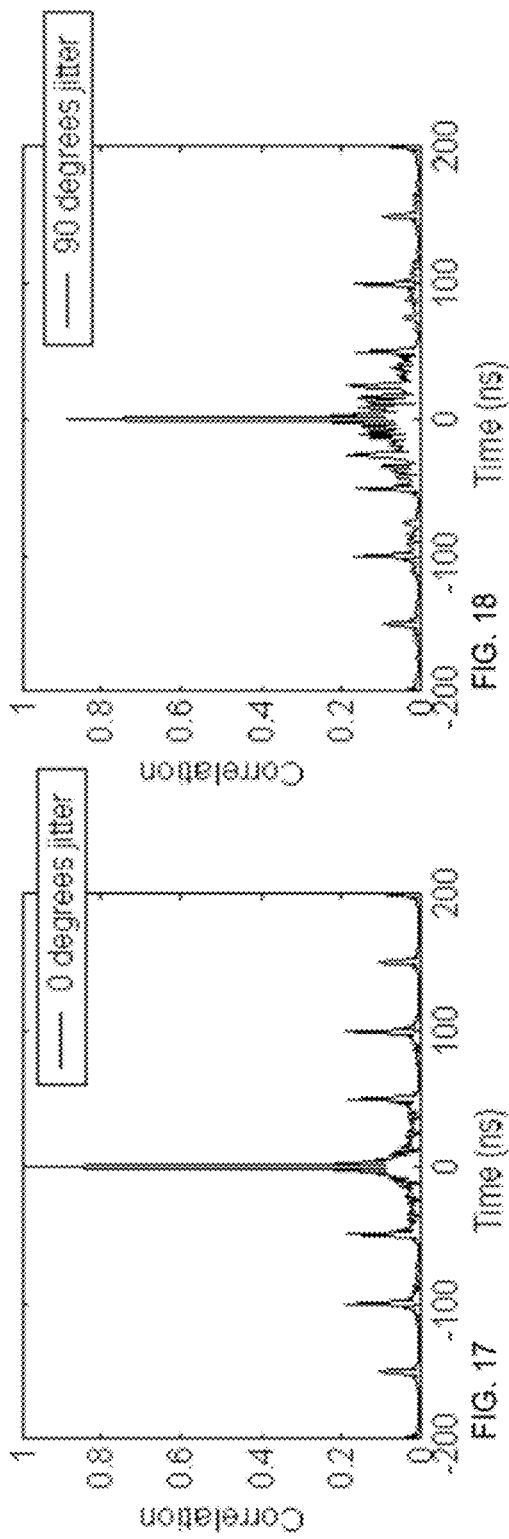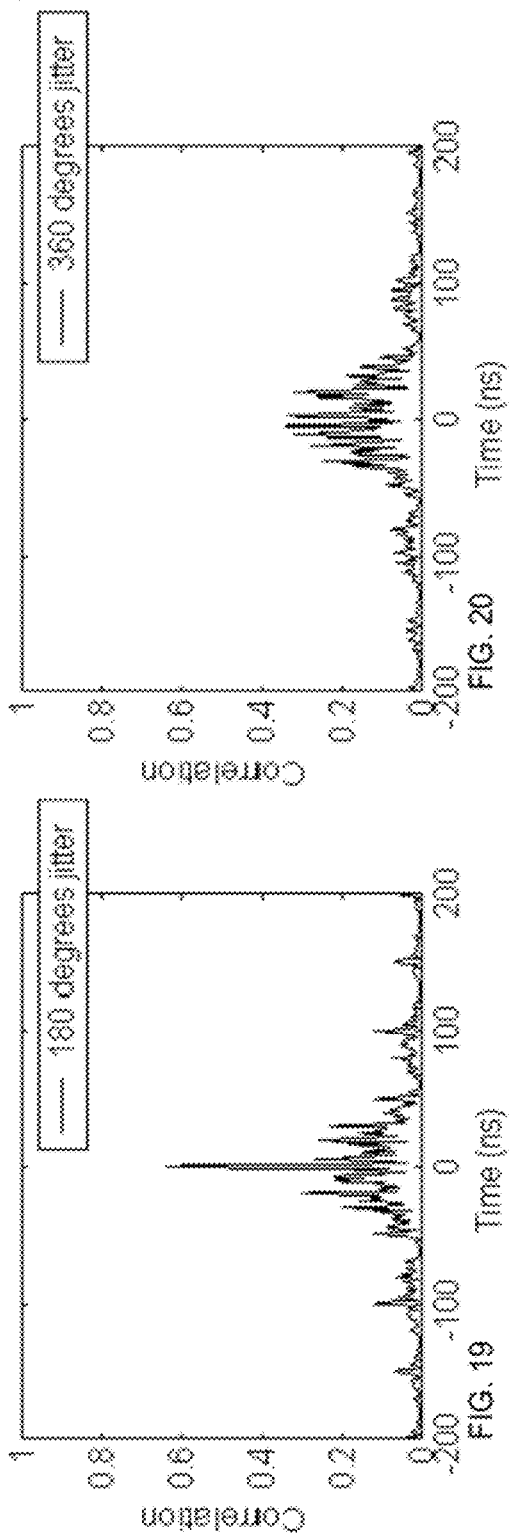

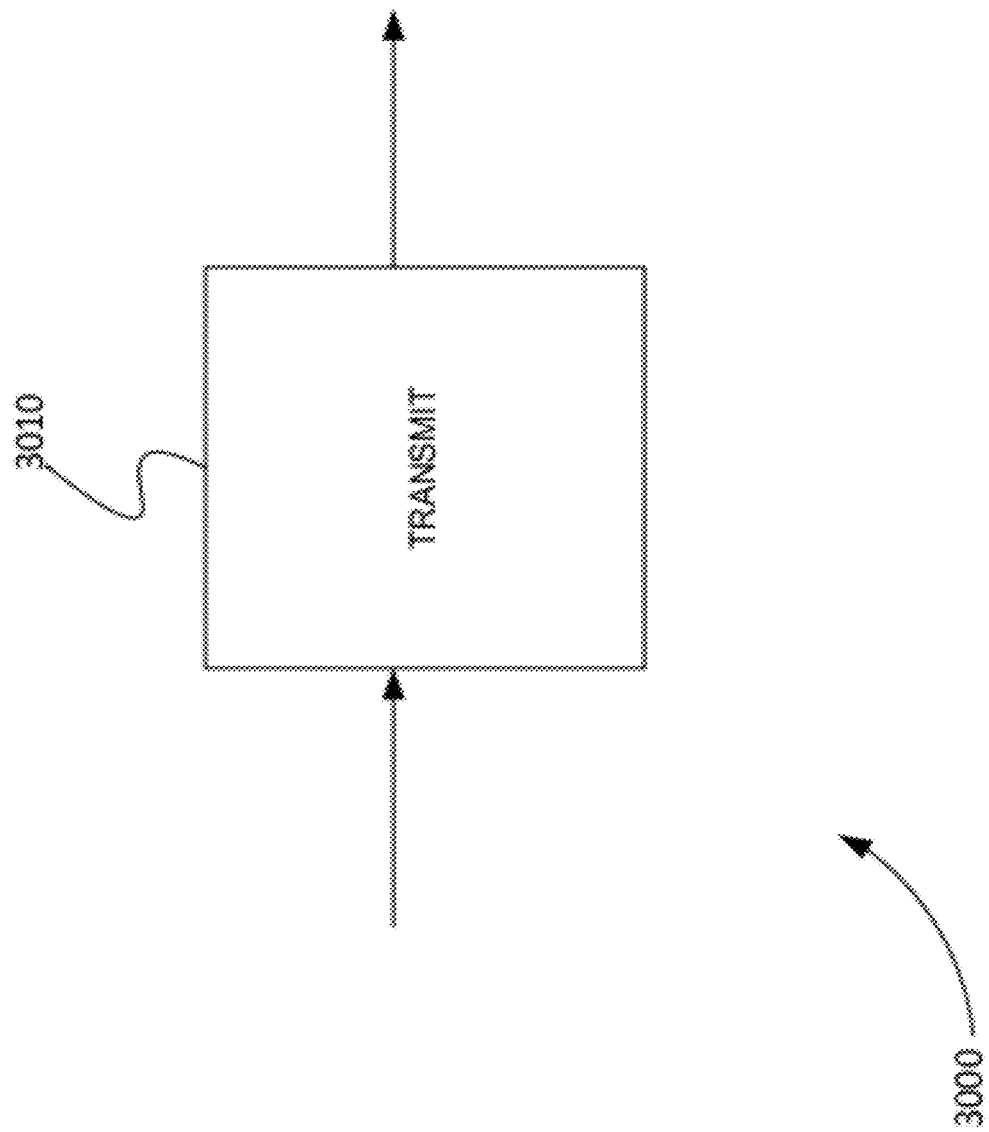

SYSTEM AND METHOD FOR HIGH RESOLUTION INDOOR POSITIONING USING A NARROWBAND RF TRANSCEIVER

CROSS-REFERENCE TO RELATED APPLICATION

This application claims the benefit of U.S. Provisional Patent Application No. 61/409,123 filed Nov. 2, 2010 and U.S. Provisional Patent Application No. 61/421,641 filed Dec. 10, 2010, which are incorporated by reference herein in their entireties.

INTRODUCTION

There is a strong market need for an indoor electronic positioning system that can provide one-meter accuracy or better. Mobile retail applications for smart phones are perhaps the biggest revenue driver behind this need, allowing users to find out what is currently on sale in the aisle of the store they are in, to find out which items from their shopping list are sold in the aisle they are walking in, or simply to get information on a nearby product or display. Other important applications include medical device location and staff location in hospitals, indoor E911, search and rescue, route guidance inside large buildings, wireless robots, and route guidance for the blind.

State-of-the-art indoor positioning systems for IEEE 802.11 Wi-Fi™ devices are generally power-of-arrival (PoA) based, with accuracies on the order of ten meters at 90% confidence. PoA-based positioning systems require calibration by physically walking a measurement device through an area of interest, which is a time-consuming and expensive process. PoA-based systems are also known to require a relatively high density of access points (APs) in order to achieve even ten-meter accuracy. To improve the PoA-based accuracy from ten to five meters, one can make a strong argument that the AP density would need to increase by a factor of four, with additional four-fold density increases for each additional two-fold accuracy improvement.

Time-of-flight (ToF) based positioning systems such as GPS allow devices to estimate their position by measuring the arrival times of signals transmitted by multiple radio emitters at known positions, converting the arrival times into distances by dividing by the speed of propagation, and solving for position using trigonometry. ToF-based positioning systems generally do not require calibration and their accuracy is generally not limited by AP density. The problem with ToF is its accuracy indoors; although these systems work very well outdoors, they perform notoriously poorly in indoor environments. The main reason for their poor performance is multipath—signal reflections off of walls, ceilings, etc. that smear the arrival time of the over-the-air signals, making it hard to determine the arrival time of the line-of-site (LOS) or shortest-distance path. Several companies have attempted to deploy ToF-based Wi-Fi™ location systems indoors as of the time of this writing, but none at present are known to deliver sub ten-meter accuracy.

One well-known way to mitigate the multipath problem is to use very wideband location signals—hundreds of megahertz wide for indoor RF applications. The wide signal bandwidth increases the resolution in the time-domain, allowing receivers to distinguish the LOS path from other delayed reflected paths (see FIG. 1). The challenges with using wideband signals are: (1) wideband radios require leading edge, high-speed components which are expensive to manufacture, and (2) since spectrum allocation differs from country to country, it's difficult to standardize a wideband technology that will work in more than one country and enjoy good economies of scale. This is one reason why the so-called Ultra-wideband (UWB) technology that was first introduced in the late 1990's failed to become standardized. In the U.S., the FCC also placed severe restrictions on UWB's transmit power to minimize interference, thus limiting its operating range and hence suitability for many applications.

BRIEF DESCRIPTION OF THE DRAWINGS

The skilled artisan will understand that the drawings, described below, are for illustration purposes only. The drawings are not intended to limit the scope of the present teachings in any way.

FIGS. 13-16 are exemplary plots that show correlation vs. peak-to-peak inter-packet timing jitter amplitude for a TF-WB waveform consisting of K=23 802.11g OFDM packets, in accordance with various embodiments.

FIGS. 17-20 are exemplary plots that show correlation vs. peak-to-peak carrier phase jitter amplitude for a TF-WB waveform consisting of K=23 802.11g OFDM packets, in accordance with various embodiments.

FIG. 30 is a schematic diagram of a system that includes a transmit module that performs a method for calculating the time of arrival of a wireless signal through a wireless channel, in accordance with various embodiments.

Figure 1:
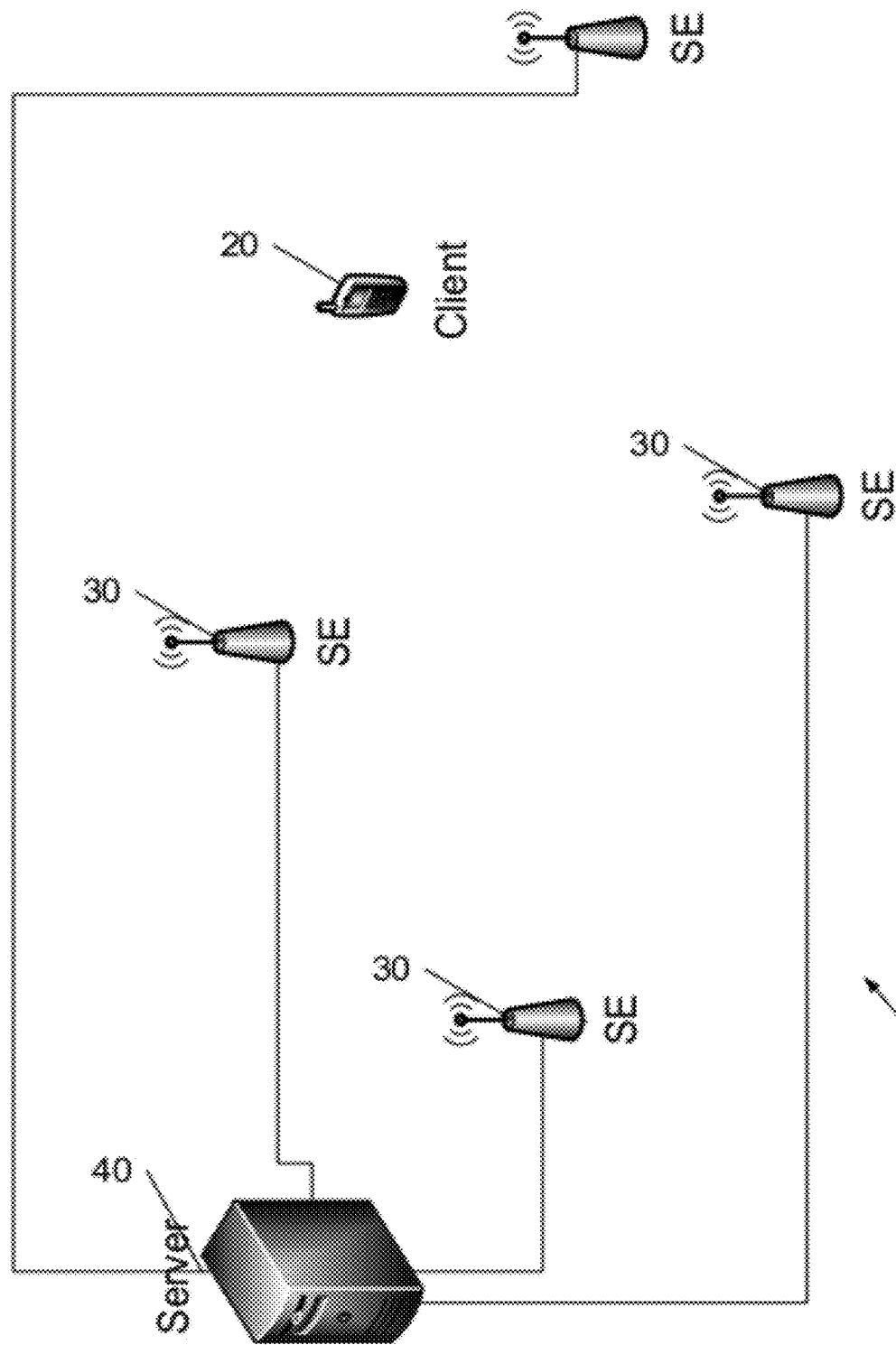
FIG. 1 is schematic diagram of a time-of-flight (ToF)-based positioning system, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Various embodiments, referred to herein as Time/Frequency Offset Wideband (TF-WB) signaling, enjoy all of the advantages of other state-of-the-art wideband or ultra-wideband signaling schemes without being burdened by the aforementioned challenges. Various embodiments are first described briefly at a high-level, followed by a detailed description at the physical and data link layers. To clarify the terminology, the use of the term "narrowband" in this discussion refers to signals that have a bandwidth of less than 40 MHz, and the term wideband is reserved for signals that have bandwidth exceeding 100 MHz. The term "ultra-wideband" is commonly accepted to mean signal bandwidths in excess of 500 MHz.

System Overview

FIG. 1 is schematic diagram of a ToF-based positioning system 100, in accordance with various embodiments. System 100 includes a mobile Client device 20, a plurality of sensor/emitter (SE) devices 30 and a Server 40. The Client device 20 is typically a battery-powered mobile device such as a Smartphone or a laptop computer containing a wireless communication chipset that complies with a wireless standard such as IEEE 802.11/Wi-Fi™ or Bluetooth. The SE devices 30, typically the size of a Wi-Fi™ access point (AP), are placed in various known positions in an indoor environment such as a hospital, retail store or a shopping mall. The Server 40 is used to control the behavior of the Client and SEs during the ToA measurements, and to locate the Client based on ToA measurements received from the SEs.

The SEs can be configured as sensors, which only receive ToF location signals from the client, emitters, which only transmit to the Client, or both. When configured as emitters, each SE periodically broadcasts TF-WB location beacon signals, allowing listening Clients to self-locate by measuring the ToA of the beacon signals received from multiple SEs. This is similar to how GPS is used today, with satellites being the emitters for GPS. When configured as sensors, each SE measures the ToA of one or more TF-WB transmissions received from the Client to estimate its position.

All SEs in a network may need to be time synchronized to a common time base. In emitter mode, this allows the SEs to transmit their TF-WB location beacons at exactly the same time, using OFDMA to differentiate their transmissions at the client (the details for this technique are described in Section entitled "Multiplexing TF-WB Transmissions From Multiple Devices" below). After down-converting, digitizing and storing a set of these beacon transmissions from SEs at known positions, a Client can compute the ToAs of these signals and estimate its position $\hat{u}=[x\ y\ z]^T$ by solving the equation $$\hat{u} = \underset{u}{\operatorname{argmin}} \underset{t}{\operatorname{min}} \sum_{n=1}^{N} ||u - u_n| - c(t_n - t)|^2,$$

where $u_n$ is the known [x y z] position of the nth SE, c is the speed of light, $t_n$ is the Client's measured ToA of the nth beacon transmission, and t is the unknown SE beacon transmission time.

In sensor mode, the SEs monitor incoming TF-WB transmissions from the Client, estimate their ToAs and pass the ToA estimates to the server, which estimates the Client position by solving $$\hat{u} = \underset{u}{\operatorname{argmin}} \underset{t}{\operatorname{min}} \sum_{n=1}^{N} ||u - u_n| - c(t_n - t)|^2,$$

where $u_n$ is the known [x y z] position of the nth SE, c is the speed of light, $t_n$ is the nth SE's ToA estimate (referenced to the SE's global time base), and t is the unknown transmission time of the Client's TF-WB location signal.

In practice, regardless of whether the SEs are configured as emitters or sensors, the bottleneck in terms of location accuracy is the accuracy of the time-of-arrival estimates. Since radio signals travel at the speed of light, a timing error of even a few nanoseconds (billionths of a second) will exceed the one-meter positioning error budget.

Figure 3:
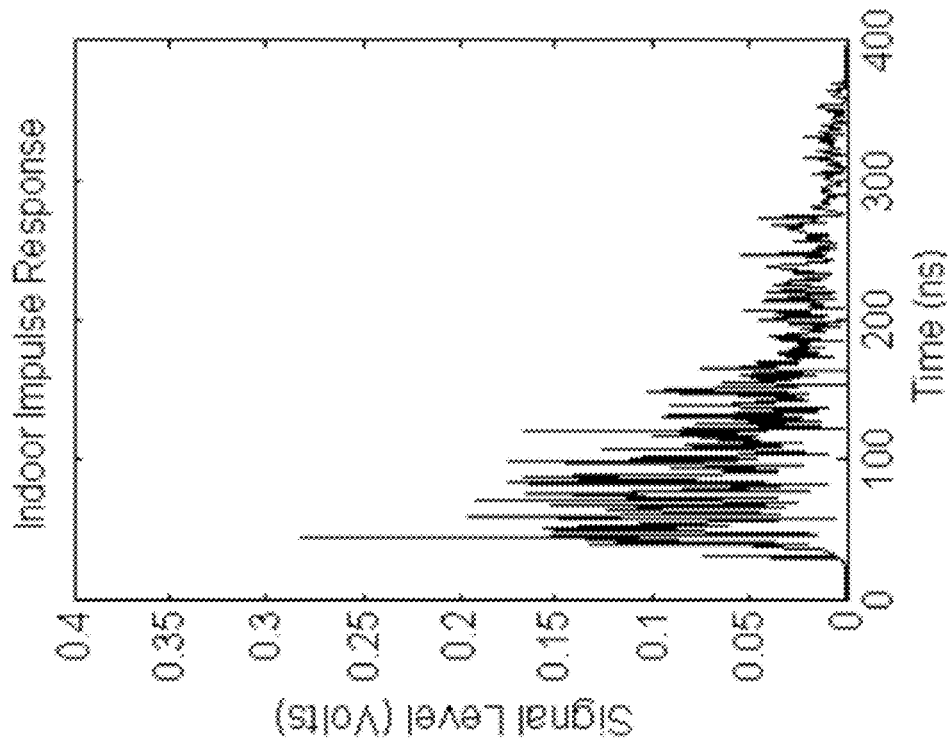
FIG. 3 is an exemplary plot that shows an impulse response from an indoor channel (e.g., an office environment), in accordance with various embodiments.
Figure 2:
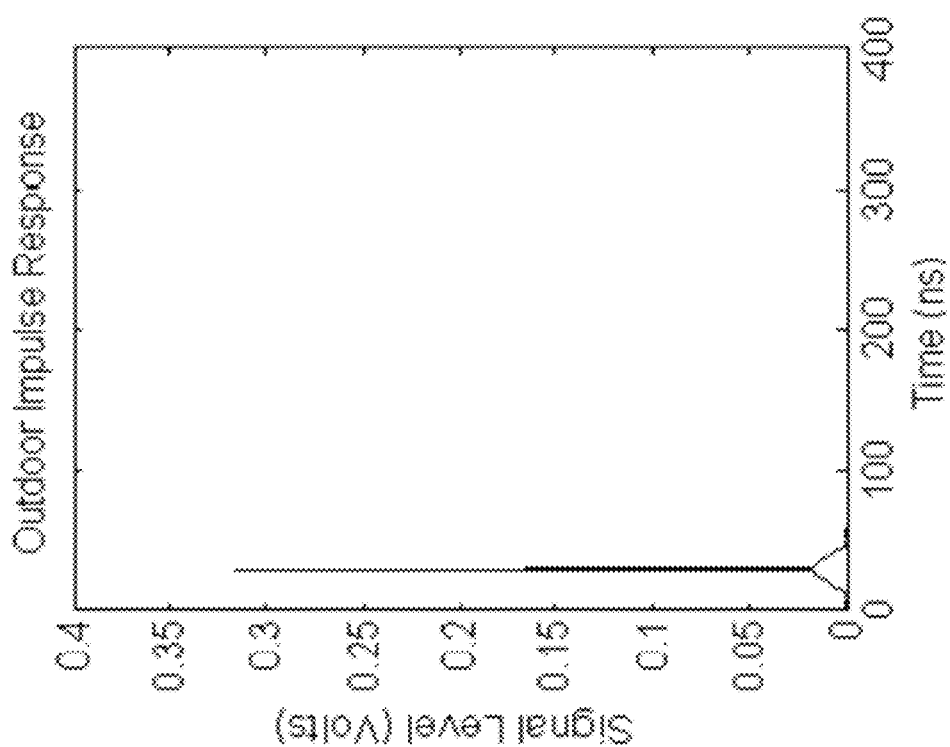
FIG. 2 is an exemplary plot that shows an impulse response from an outdoor channel, in accordance with various embodiments.
Figure 4:
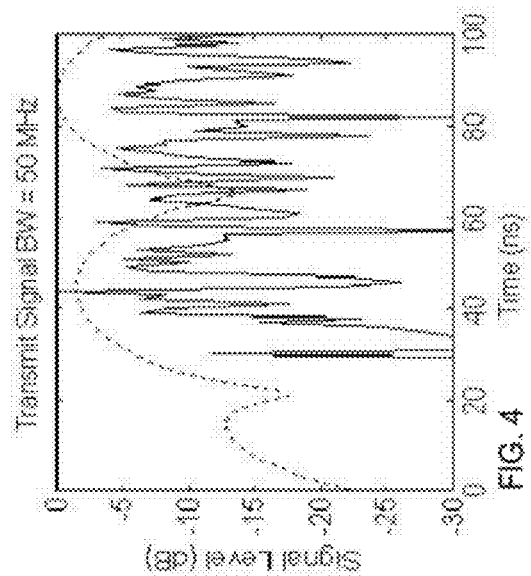
FIGS. 4-7 are exemplary plots that show the cross-correlation between a baseband signal x(t) that is sent through the indoor channel impulse response of FIG. 3 and the channel output for various signal bandwidths, in accordance with various embodiments.
Figure 5:
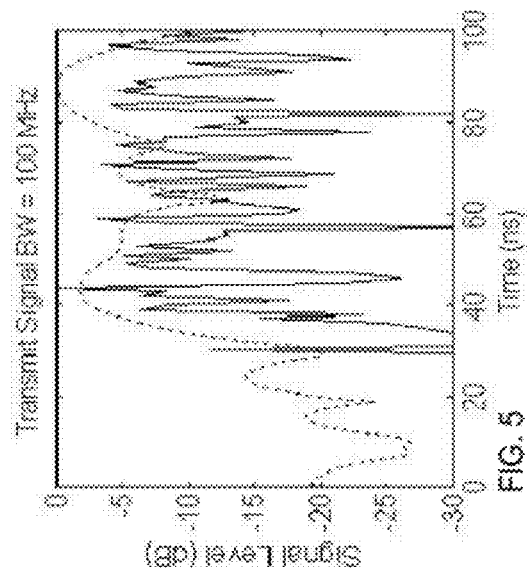
Figure 6:
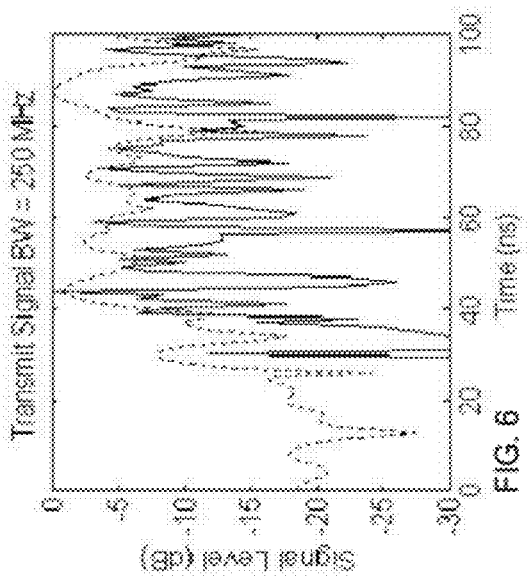
Figure 7:
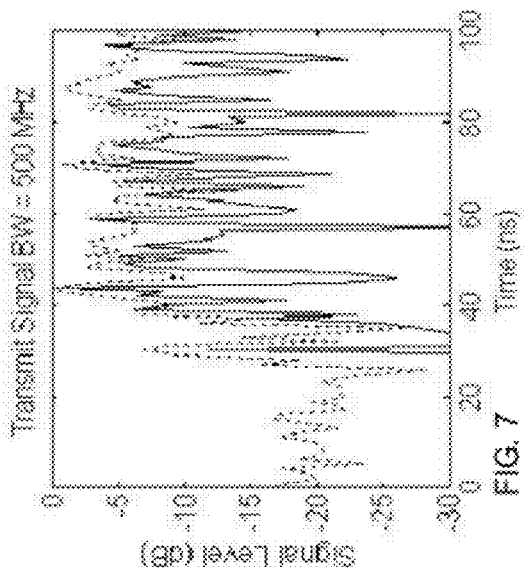

FIG. 2 is a plot 200 that shows an impulse response from an outdoor channel, in accordance with various embodiments. FIG. 3 is a plot 300 that shows an impulse response from an indoor channel (e.g., an office environment), in accordance with various embodiments. The spike at 30 ns in plots 200 and 300 represents the shortest-distance LOS path between the transmit and receive antennas. Since light travels at approximately one foot per ns, this means the antennas in this example are separated by about 30 ft. The outdoor response shows virtually zero energy after the LOS path. The indoor response shows literally hundreds of closely spaced reflections after the LOS.

To estimate the arrival time of a signal sent through this channel, a commonly used approach is for the transmitter to send a known signal to the receiver, then for the receiver to correlate the known signal against what it receives through the channel and estimate the ToA as the ToA of the earliest correlation peak that exceeds some appropriate threshold. Mathematically, using x(t) to represent the complex baseband transmit signal, y(t) the complex baseband received signal, h(t) the complex channel impulse response, and z(t) the correlator output, one can write:

$$y(t) = \int_{-\infty}^{\infty} x(t-\tau)h(\tau)\,d\tau + \upsilon(\tau)$$

and $$z(t) = \left| \int_{-\infty}^{\infty} y^*(t)x(t-\tau)\,dt \right|,$$

where υ(t) is complex additive white Gaussian noise.

FIGS. 4-7 are exemplary plots that show the cross-correlation between a baseband signal x(t) that is sent through the indoor channel impulse response of FIG. 3 and the channel output for various signal bandwidths, in accordance with various embodiments. FIGS. 4-7 show channel impulse responses (solid lines) and correlator outputs (dashed lines) for transmit signal bandwidths of 50, 100, 250 and 500 MHz, respectively. In each case, x(t) is a 1023-bit pseudo-random NRZ sequence filtered through a root-raised cosine low pass filter. The only difference among the 4 cases is the symbol rate and hence the RF bandwidth of x(t).

FIGS. 4-7 show why accurate ToA estimation indoors needs very wideband signals. It's because there are so many signal reflections in the vicinity of the LOS path that the only way to get the needed time-resolution is to use a very wideband signal. Without sufficient time resolution, it is too difficult to differentiate the LOS from other paths.

Time-Frequency Offset Wideband Signaling—Theory of Operation

Figure 8:
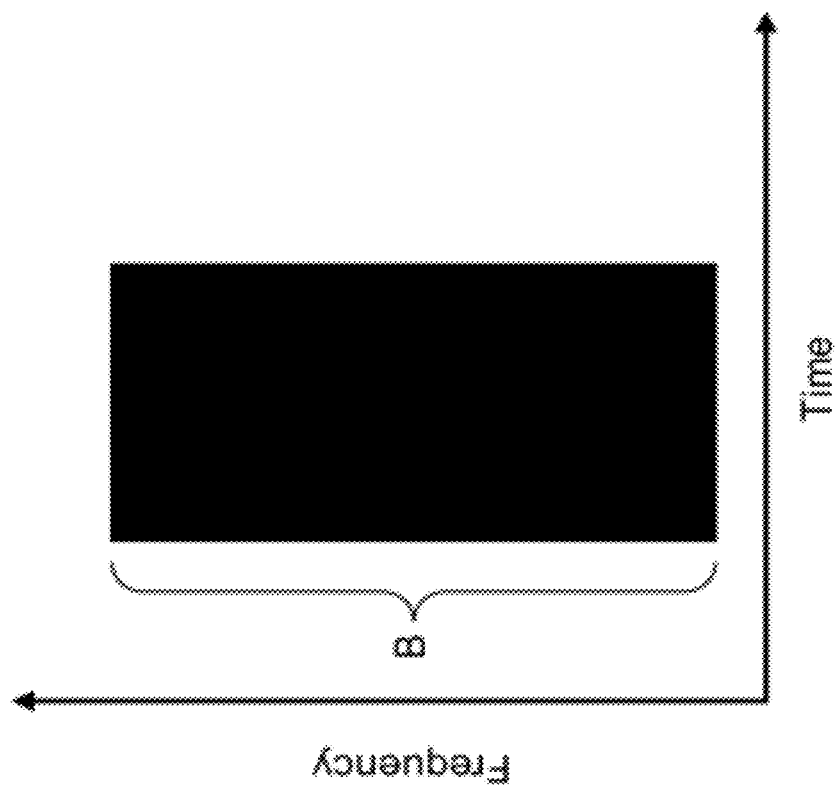
FIG. 8 is an exemplary plot showing a traditional approach for transmitting a wideband or ultra-wide band signal, in accordance with various embodiments.

FIG. 8 is an exemplary plot showing a traditional approach for transmitting a wideband or ultra-wide band signal, in accordance with various embodiments. The traditional approach for transmitting a wideband or ultra-wide band signal is to send one signal packet that spans the entire transmission bandwidth, B, as illustrated in FIG. 8. This approach was proposed, for example, in competing UWB standards.

Figure 9:
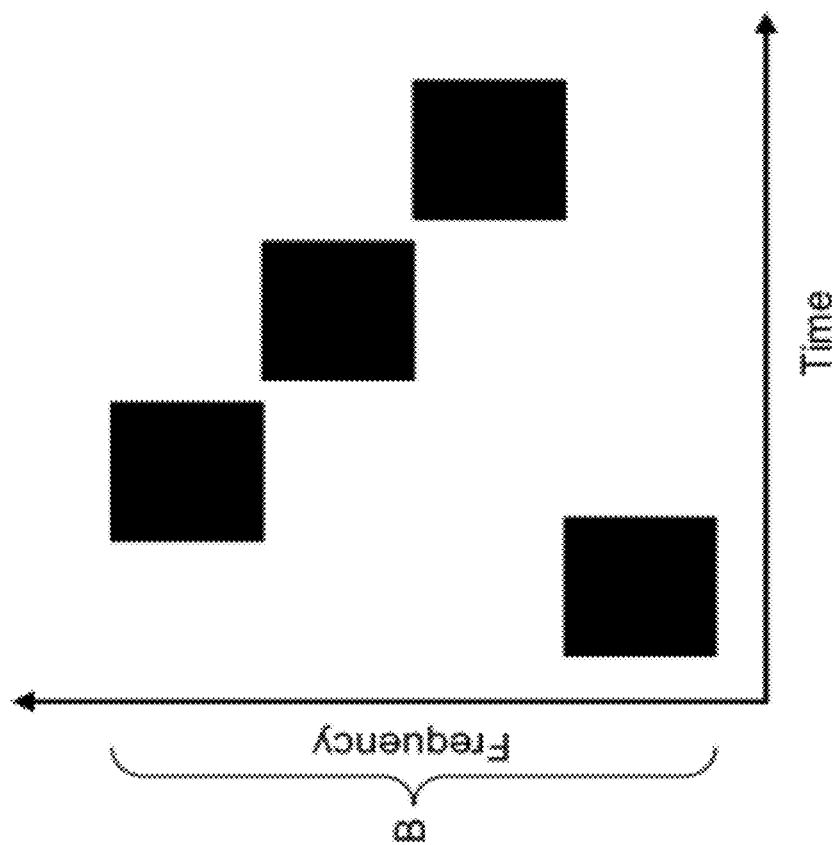
FIG. 9 is an exemplary plot showing a time/frequency offset wideband (TF-WB) signaling approach for transmitting a wideband or ultra-wide band signal, in accordance with various embodiments.

FIG. 9 is an exemplary plot showing a time/frequency offset wideband (TF-WB) signaling approach for transmitting a wideband or ultra-wide band signal, in accordance with various embodiments. Instead of sending one broadband packet that spans all frequencies, TF-WB sends multiple narrowband packets at different times and frequencies in order to span the same bandwidth, B. It can be shown that the TF-WB approach provides the same time resolution benefits as the more traditional techniques as long as it spans the same amount of bandwidth. Although it generally takes longer to cover the same amount of spectrum using a sequence of TF-WB transmissions as it does using a single wideband or UWB transmission, TF-WB enjoys several important advantages, which are highlighted below.

The most important advantage is that its use of narrowband signals allows TF-WB to be adapted to just about any of today's popular wireless standards such as Bluetooth, IEEE 802.11 or 3G/4G cellular, using the same low-cost hardware platforms with at most only superficial changes to the chipset and software. For example, to send a TF-WB signal using an IEEE 802.11 Wi-Fi™ chipset, one sends a sequence of 802.11 packets (for example, Probe Request packets) at different times and frequencies. This makes it possible to perform high-resolution location on Wi-Fi™ smart-phones by re-using the same Wi-Fi™ chipset that is also used for Internet data communication. If one of the state-of-the-art UWB technologies was used instead, one would have to burden the smart-phone with the additional cost, size and battery energy needed to support a new chipset, antenna, and software needed to implement the new wireless protocol. As mentioned earlier, traditional UWB radios also cost more to manufacture and consume more DC current than their narrowband counterparts.

Also, as alluded to earlier, another critical advantage is regulatory. In the U.S., UWB systems are required by the FCC to transmit no more than −41.3 dBm per MHz of bandwidth. Indoor Wi-Fi™ systems, on the other hand, typically transmit up to 7 dBm per MHz. This gives a TF-WB over Wi-Fi™ system a 48 dB or approximately a thirty-fold range advantage over a UWB system indoors.

The basic steps for transmission, reception and ToA estimation using TF-WB signaling are as follows.

1. Transmitter sends a sequence of narrowband signals at different times and frequencies to the receiver. It is assumed that the time, frequency, and carrier phase differences among the signal transmissions are known to the receiver.

2. Receiver listens for the transmissions at the known times and frequencies using its narrowband radio while digitizing and storing them for post-processing.

3. Receiver uses the stored receive signals and the known time, frequency and carrier phase differences of the transmissions to obtain a high-resolution estimate of the time-of-arrival of the received signals at its antenna.

In a preferred embodiment, the transmitted signals are waveforms—physical layer representations of binary data packets that are defined in a wireless standard such as Bluetooth, IEEE 802.11 Wi-Fi™ or 3G or 4G cellular.

Figure 10:
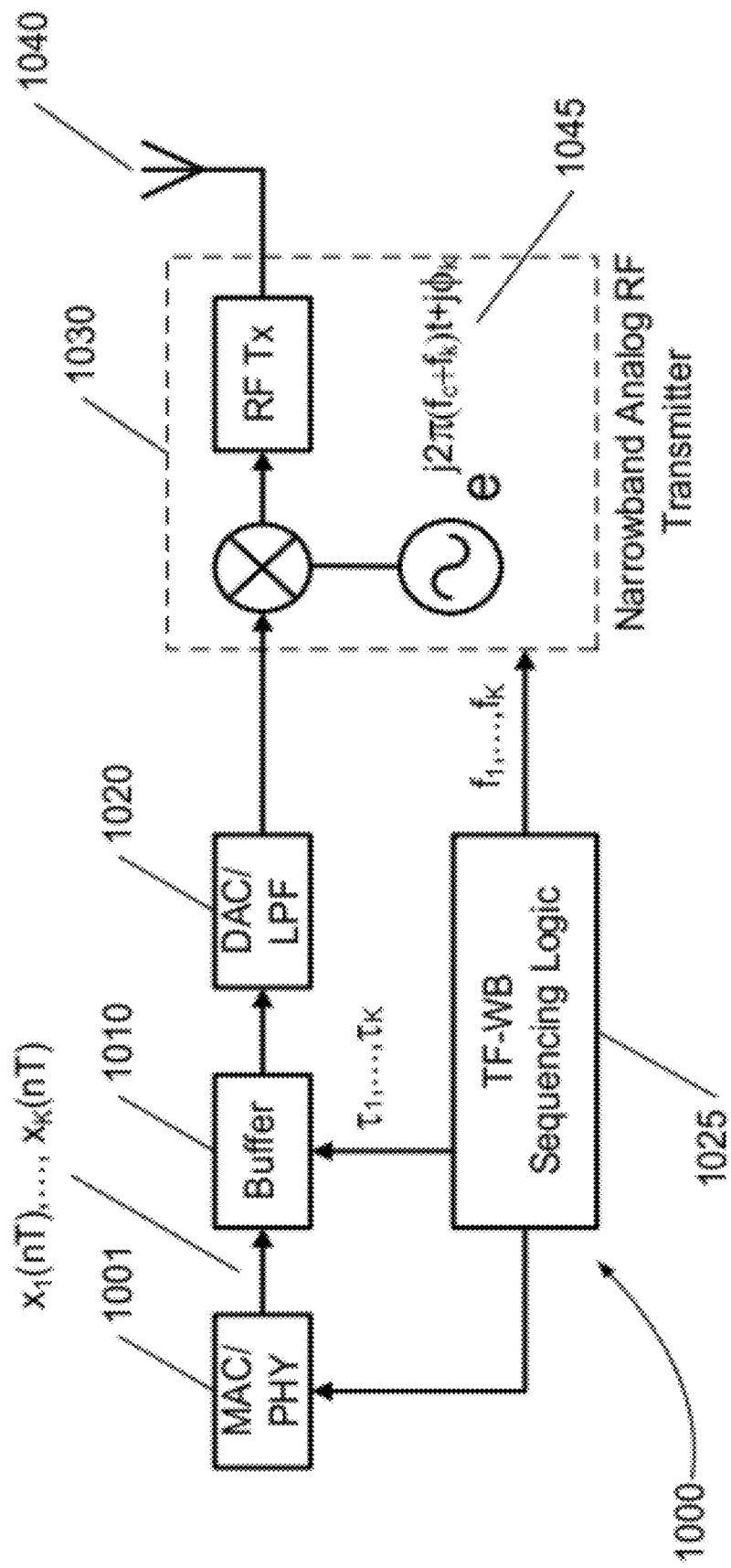
FIG. 10 is a schematic diagram of the internal architecture of a TF-WB transmitter, is accordance with various embodiments.

FIG. 10 is a schematic diagram of the internal architecture of a TF-WB transmitter 1000, is accordance with various embodiments. Samples of the narrowband physical layer complex baseband waveforms are generated on the fly by MAC and PHY units 1001, and stored in a buffer 1010 until it's time to transmit them. They are then passed to a complex digital-to-analog converter 1020, where they are digitized and lowpass filtered. The filtered complex DAC output is passed to a narrowband analog RF transmitter 1030 where it is I/Q modulated, up-converted 1045 to the appropriate RF frequency and sent over-the-air through the antenna 1040. The transmitter's TF-WB Sequencing Logic 1025 controls the timing at which the narrowband signals are presented to the DAC and directs the RF transmitter to tune its LO synthesizer to the appropriate frequencies at the appropriate times.

A mathematical representation of the TF-WB transmit signal leaving antenna 1040 is $$x(t) = \text{Re}\left\{ \sum_{k=1}^{K} x_k(t-\tau_k) e^{j2\pi(f_c+f_k)t + j\phi_k} \right\}, \quad (1)$$

where Re(z) represents the real part of the complex number z, K is the number of narrowband waveforms transmitted, and $x_k(t)$ is the complex envelope of the kth narrowband waveform transmitted at time $\tau_k$, carrier frequency $f_c+f_k$ and carrier phase $\phi_k$. The transmission time $\tau_1$ of the first waveform can be assumed to be zero without loss of generality. This way, the remaining $\tau_k$ can be viewed as time offsets relative to transmit time of the first waveform.

Figure 11:
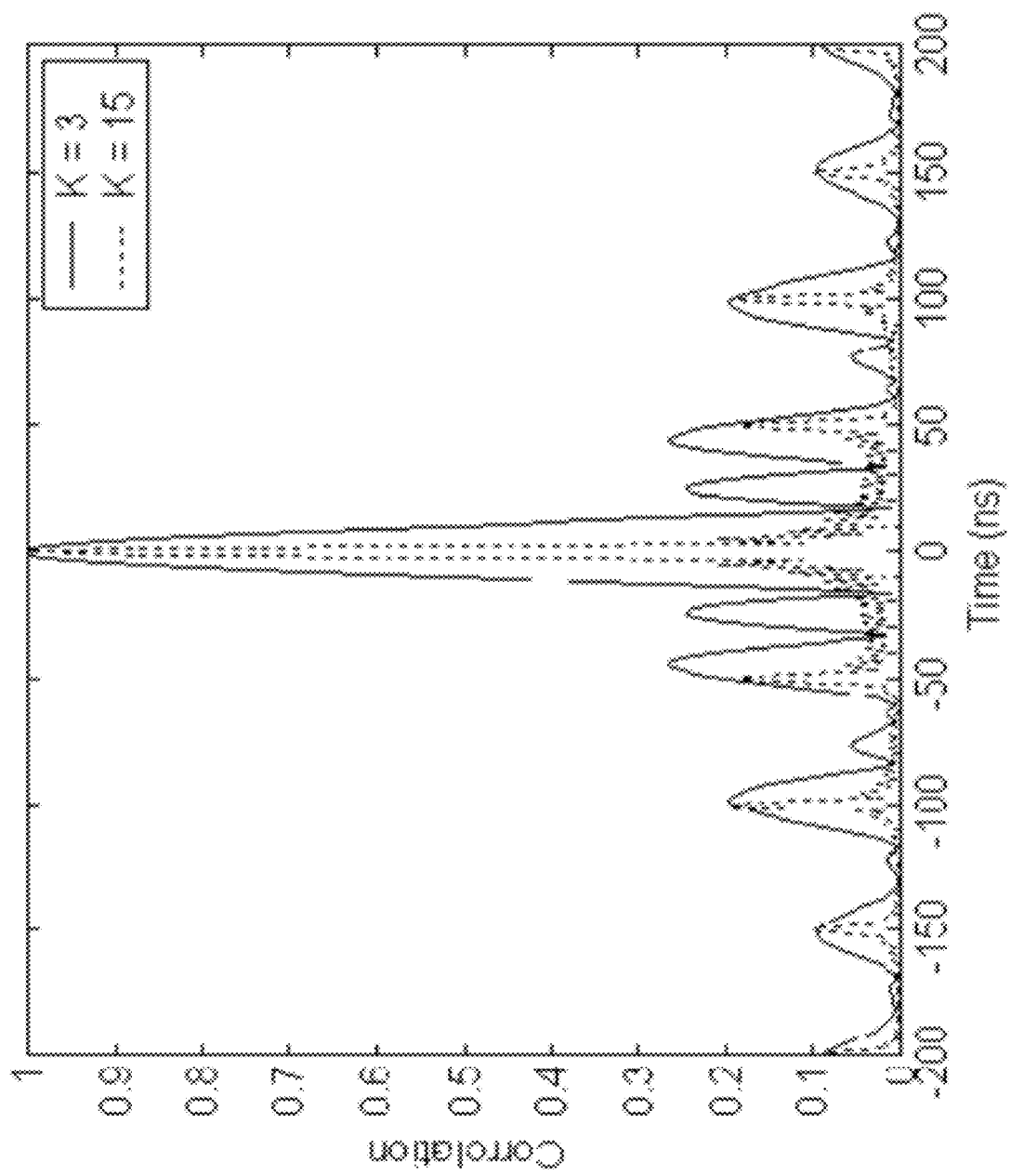
FIG. 11 is an exemplary plot showing autocorrelation functions for two different example TF-WB signals, in accordance with various embodiments.

FIG. 11 is an exemplary plot showing autocorrelation functions for two different example TF-WB signals, in accordance with various embodiments. The autocorrelation functions are generated according to equation (1) using K=3 and K=15 repetitions, where each narrowband transmission is a 20 MHz wide IEEE 802.11g OFDM packet. The same packet is repeated K times at different times and frequencies. The spacing between the offset frequencies $f_k$ is 20 MHz. The packet duration is 320 μs, and the timing gap between transmissions is 100 μs. Note how the time resolution increases as the number of narrowband signals K, and hence the bandwidth (which is 20K MHz) is increased.

Figure 12:
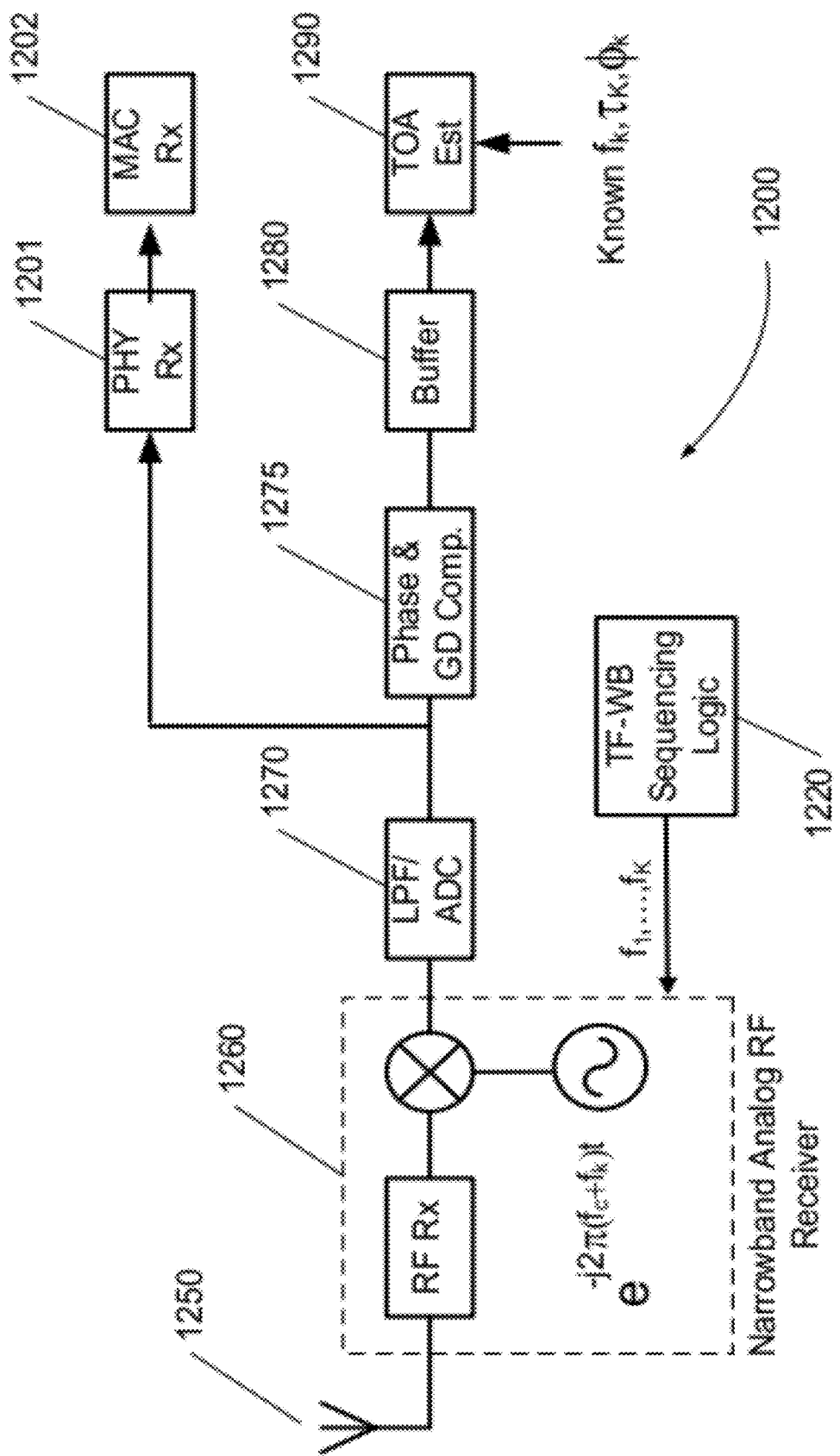
FIG. 12 is a schematic diagram of the internal architecture of a TF-WB receiver, is accordance with various embodiments.

FIG. 12 is a schematic diagram of the internal architecture of a TF-WB receiver 1200, is accordance with various embodiments. The received TF-WB signal enters through the antenna 1250, is down-converted to complex baseband by the narrowband analog RF receiver 1260, lowpass filtered through a narrowband filter and digitized via a complex analog-to-digital converter 1270, digitally allpass filtered and phase shifted to compensate for gain-dependent group delay and phase shifts 1275, and stored in a buffer 1280 where it awaits processing by the ToA Estimator 1290. The ADC samples are also routed to PHY demodulator and MAC Rx blocks 1201 and 1202, respectively. The receiver also has TF-WB Sequencing Logic 1220 to direct the RF Receiver 1260 to tune its LO synthesizer to the appropriate frequencies at the appropriate times.

FIGS. 13-16 are exemplary plots that show correlation vs. peak-to-peak inter-packet timing jitter amplitude for a TF-WB waveform consisting of K=23 802.11g OFDM packets, in accordance with various embodiments. FIGS. 13-16 were generated from simulations in which the inter-packet spacing between the K waveforms was shortened or lengthened from its nominal value by a randomly generated jitter time using a uniform probability distribution. A different random number was generated for each of the K-1 inter-packet intervals.

FIGS. 17-20 are exemplary plots that show correlation vs. peak-to-peak carrier phase jitter amplitude for a TF-WB waveform consisting of K=23 802.11g OFDM packets, in accordance with various embodiments. FIGS. 17-20 were generated from simulations in which the carrier phase difference between the 1st and the remaining K-1 waveforms was rotated from its nominal value by a randomly generated jitter value using a uniform probability distribution. A different random number was generated for each of the K-1 phase differences.

FIGS. 13-16 and FIGS. 17-20 show how receiver uncertainty in the carrier phase and inter-packet timing between narrowband transmissions affects performance. The figures show the cross-correlation between an ideal and a distorted 802.11g-based TF-WB waveform with K=23 narrowband transmission frequencies. The figures clearly show why it's critical for the receiver to have accurate knowledge of the values of these parameters. There are several ways for the receiver to get this information:

1. The parameters can be specified in a wireless standard. For example, the IEEE 802.11 standards committee can release an updated specification that documents rules for transmitting 802.11-based TF-WB signals. These rules can require all TF-WB-compatible transmitters to use a fixed inter-packet spacing of, say, 100 μs+/−0.1 ns, and a carrier phase difference of at most 3 degrees between any two transmitted packets.

2. The transmitter can communicate this information to the receiver, either by embedding it in each transmitted packet or using a system configuration message. As an example of the former, the transmitter could encode and embed each packet's time of departure on a high-speed clock in a time-stamp field, it could encode and embed the carrier phase during each packet's transmission into a phase-stamp field, or it could encode and embed the inter-packet timing and/or inter-packet carrier phase differences into time-difference and/or phase-difference fields. An example of the latter would be for the transmitter to send a message to the receiver after it joins the network letting the receiver know that it uses an inter-packet spacing of 100 μs+/−0.1 ns and a carrier phase difference of at most 3 degrees between any two transmitted packets for all TF-WB transmissions.

Depending on how the system is implemented, a standards specification can document the following additional TF-WB-related information:

1. The receiver may need to know the sequence of frequencies, the number of transmissions per frequency in order to properly receive and decode a TF-WB signal. The transmitter can either embed this information in a TF-WB Information Message that it sends to the receiver, or can periodically broadcast this information (if it's an 802.11 AP, in a Beacon message, for example) so that all receivers can get this information.

2. For Clients that perform self-location by measuring the ToAs of incoming TF-WB transmissions from the SEs, the Client will need to know the physical location of each of the SEs within earshot, when to listen for their TF-WB transmissions, the sequence of frequencies and number of transmissions per frequency, and how the transmissions from multiple SEs are multiplexed (e.g., using OFDMA or TDMA is used, if ODMA, which SEs are assigned to which sub-carriers; if TDMA, which SEs are assign to which timeslots). For this kind of information, a periodic network broadcast makes the most sense (for Wi-Fi™, perhaps using the Beacon message).

3. For systems in which the SEs locate the Clients by listening to their transmissions, each client would need:

a. An assigned time slot in which to send its TF-WB message (for Wi-Fi™, for example, this can be specified as a time relative to the AP Beacon transmission)

b. The frequencies, number of transmissions per frequency and time between transmissions c. Information on how to multiplex its transmissions with other clients. If OFDMA, this would be an assigned set of sub-carriers, if DSSS, an assigned spreading code.

For this kind of information, a uni-cast "TF-WB Information" message exchange to the client from the network seems most appropriate.

Returning to the ToA Estimator block 1290 of FIG. 12, the receiver uses the following high-level steps to estimate the time-of-arrival of a received TF-WB waveform sequence.

In step 1, the receiver digitally up-converts the received narrowband observation waveforms to their known offset frequencies and sums, yielding a wideband observation waveform.

In step 2, the receiver synthesizes a narrowband reference waveform corresponding to each of the received narrowband observation waveforms using the known (and optionally decoded) portions of the data packets and the rules prescribed by the wireless standard.

In step 3, given the narrowband reference waveforms the known time, frequency and carrier phase offsets and a hypothetically selected channel propagation delay, the receiver defines a model to generate a "wideband model output waveform"—a most-likely guess for what the wideband observation waveform would look like given the known information and that prescribed channel propagation delay.

In step 4, the receiver uses a one-dimensional search to find the channel propagation delay that most closely matches the wideband model output and wideband observation waveforms. The resulting channel propagation delay from this process is the estimated time-of-arrival.

Next, these steps are described again in greater detail and with more mathematical rigor:

In step 1, the receiver digitally up-converts the received narrowband observation waveforms $y_k(nT)$ to their known offset frequencies $f_k$, yielding the wideband observation waveform $$y(nT) \triangleq \sum_{k=1}^{K} y_k(nT) e^{j2\pi f_k nT}.$$

For each received narrowband observation waveform $y_k(nT)$, the receiver synthesizes a corresponding narrowband reference waveform $\hat{x}_k(nT)$ by encoding and modulating known portions of the waveform (including the physical layer preamble and any known data bits) as specified by the wireless standard. The receiver may optionally chose to demodulate and decode other unknown portions of the packet and add the decoded data to the known information that gets encoded and modulated to generate the narrowband reference waveform $\hat{x}_k(nT)$ as well. If the receiver decides not to include the decoded information in the narrowband reference waveform, it sets the corresponding portions of that waveform to zero.

In step 3, given the narrowband reference waveforms $\hat{x}_k(nT)$, the known time, frequency and carrier phase offsets $f_k, \tau_k$ and $\phi_k$ and a hypothetically selected channel propagation delay $\tau_0$, the receiver generates a wideband reference signal defined by $$\hat{x}(nT, \tau_0) \triangleq \sum_{k=1}^{K} \hat{x}_k(nT - \tau_k - \tau_0) e^{j2\pi f_k(nT-\tau_0)+j\phi_k}.$$

It should be noted that with a noise and multipath-free channel and with the correct choice of $\tau_0$, the wideband reference and wideband observation waveforms should be identical.

In step 4, the receiver finds the Wiener filter that best matches the wideband reference signal $\hat{x}(nT, \tau_0)$ generated in the previous step to the wideband observation signal $y(nT)$, then filters the wideband reference signal through the Wiener filter. Mathematically speaking, the Wiener filter is given by $$h = h(\tau_0) \triangleq [R_{XX}(\tau_0)]^{-1} R_{XY}(\tau_0),$$

where $R_{XY}(\tau_0)$ is the cross correlation vector between the wideband reference and observation signals, and $R_{XX}(\tau_0)$ is the autocorrelation matrix for the wideband reference signal. Note that each candidate choice for $\tau_0$ will produce a different Wiener filter h, hence the alternative notation $h(\tau_0)$ used above.

It should be noted that with a noise-free channel and with the correct choice of $\tau_0$, (a) the Wiener filter output and the wideband observation waveforms should be identical, and (b) the frequency response of the channel and the Wiener filter should be identical over all active RF transmit frequencies.

In step 5, the receiver iteratively repeats steps 3 and 4 using various choices of $\tau_0$ to find the candidates $\hat{\tau}_0$ that minimizes the mean-square error between the Wiener filter output and the wideband observation waveform; the value of $\hat{\tau}_0$ that results from this process is the ToA estimate. This step can be written mathematically as follows:

$$\hat{\tau}_0 = \underset{\tau_0}{\operatorname{argmin}} \sum_{n} |y(nT) - \hat{x}(nT, \tau_0) * h(\tau_0)|^2,$$

where the asterisk in the above formula represents the convolution operator. Any one of a number of well-known single-dimensional minimization techniques can be used to minimize the number of iterations needed to find the optimal $\tau_0$ per the above formula, including the secant method, Newton's method, quadratic search, etc.

Round-Trip Time Measurements

Another useful application for TF-WB signaling is to use it to estimate the distance between 2 devices using round-trip-time (RTT) measurements. Both devices would need to be TF-WB aware for this scheme to work properly. Using RTT, Device 1 would send a TF-WB sequence to Device 2, then Device 2 would respond back with another TF-WB sequence, plus a protocol message containing Device 2's turnaround-time (in fractions of a nanosecond) for the response sequence. Device 1 can then compute its distance to Device 2 using the formula $$d = \frac{\tau_{1,Rx} - \tau_{1,Tx} - \tau_{2,TAT}}{2c},$$

where $\tau_{2,TAT}$ is Device 2's measured turn-around-time, i.e., the time from the beginning of the incoming TF-WB sequence received from Device 1 at Device 2's antenna to the beginning of the response packet at Device 2's antenna, (the TAT is reported to Device 1 by Device 2), $\tau_{1,Tx}$ is the time at which the outgoing TF-WB sequence leaves Device 1's antenna, and $\tau_{1,Rx}$ is the time at which the incoming TF-WB sequence arrives at Device 1's antenna, and c is the speed of light.

Multiplexing TF-WB Transmissions from Multiple Devices

If TF-WB is deployed in a real-world wireless network, some sort of multiplexing scheme is needed to differentiate TF-WB transmissions from multiple devices and to prevent them from interfering with one another. For Client self-location, for example, the Client needs to reliably receive transmissions from multiple SEs without interference. Any of the following well-known multiplexing methods can be employed for this purpose.

1. TDMA—each SE transmits its TF-WB sequence in an assigned time slot;
2. CDMA—each SE transmits its TF-WB sequence at the same sequence of frequencies and times; spreading codes are used to differentiate the transmissions at the clients (this is similar to the approach used to multiplex transmissions from multiple satellites with GPS); and
3. OFDMA—each SE transmits its TF-WB sequence at the same sequence of frequencies and times; each AP is assigned a unique mutually exclusive set of OFDM subcarriers to prevent interference.

If TF-WB was applied to the IEEE 802.11 Wi-Fi™ standard, OFDMA, TDMA or some combination of both would make the most sense; TDMA because of its simplicity and effectiveness, OFDMA because of its efficiency and the fact that Wi-Fi™ is mostly an OFDM-based standard.

Figure 21:
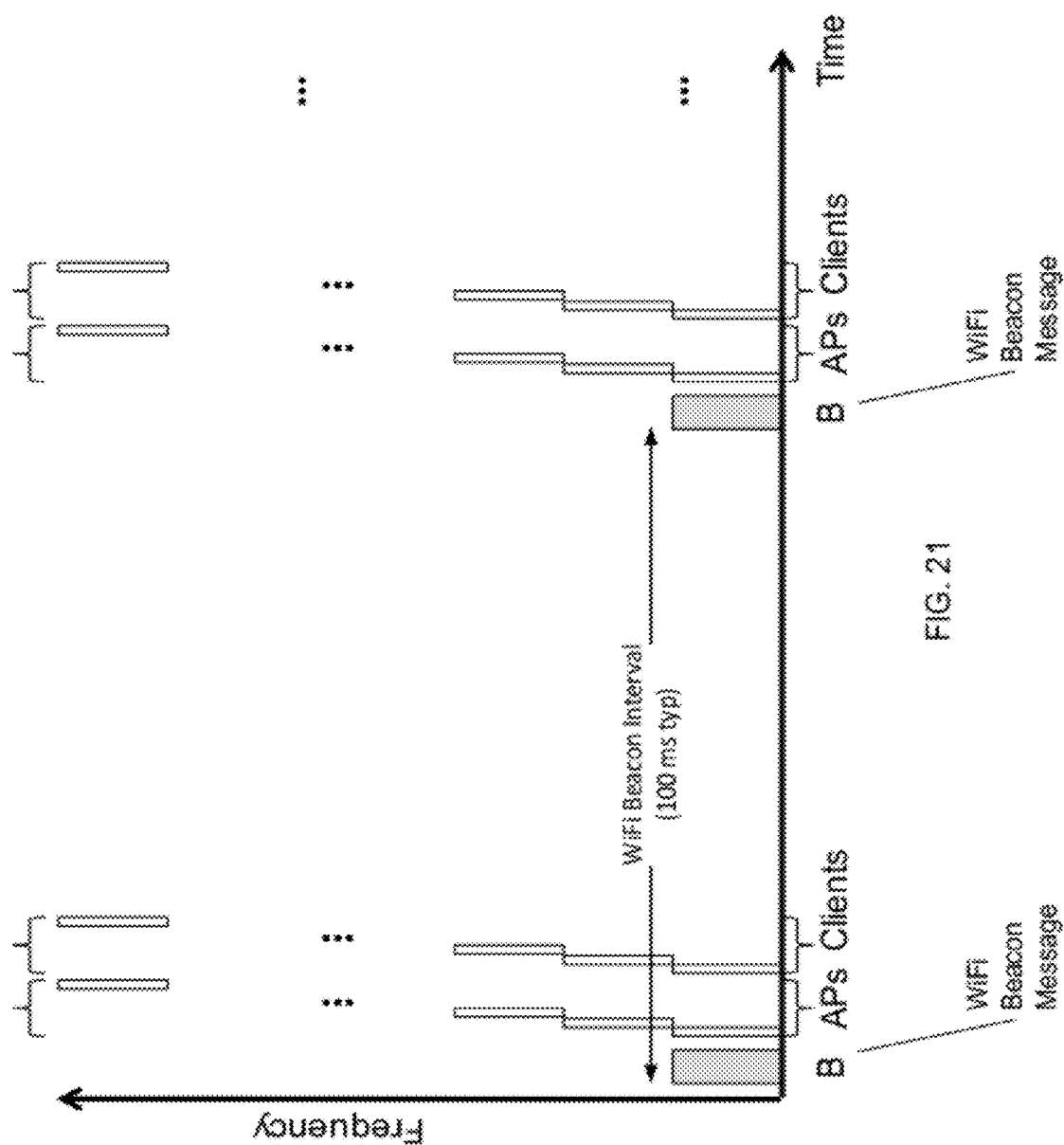
FIG. 21 is an exemplary plot of TDMA and OFDMA multiplexed transmissions from multiple clients and APs in an IEEE 802.11-based TF-WB system, in accordance with various embodiments.

FIG. 21 is an exemplary plot of TDMA and OFDMA multiplexed transmissions from multiple clients and APs in an IEEE 802.11-based TF-WB system, in accordance with various embodiments. Each AP in a multi-AP network is assigned a time slot in which to transmit its TF-WB sequence that occurs just after the periodic Wi-Fi™ Beacon message. Note that all seven of the APs are assigned to transmit in the same time slot using OFDMA to prevent interference. TDMA is only used to prevent the APs from interfering with the Clients and the Wi-Fi™ Beacon in this example—not to prevent the APs from interfering with each other.

At the beginning of each time slot, all seven APs transmit their TF-WB sequences at exactly the same times and frequencies, allowing a self-locating Client to receive, digitize and store all seven of the TF-WB transmissions simultaneously. Each AP is assigned a unique time-frequency interleaving (TFI) code. The TFI code serves two important purposes: (1) to prevent two or more of the APs from interfering with each other by transmitting on the same sub-carrier(s) at the same time(s), (2) to allow each AP to transmit on all OFDM sub-carriers at some time during each narrowband OFDM transmission. This is to ensure that there are no frequency holes in any of the transmitted signals, which is critical for good channel sounding and ToA/AoA estimation.

As an example of a TFI code that meets both of these criteria, suppose that 20 MHz 802.11g OFDM (which has 64 subcarriers) is used for the narrowband transmissions, and that each transmission contains 50 OFDM symbols. AP #1 can transmit on subcarriers 1, 8, . . . , 64 during OFDM symbols 1, 8, . . . , 50, on subcarriers 2, 9, . . . , 58 during OFDM symbols 2, 9, . . . , 44; on subcarriers 3, 10, . . . , 59 during OFDM symbols 3, 10, . . . , 45 and so on. AP #2 can transmit on subcarriers 2, 9, . . . , 58 during OFDM symbols 1, 8, . . . , 50; on subcarriers 2, 9, . . . , 58 during OFDM symbols 3, 10, . . . , 45; on subcarriers 3, 10, . . . , 59 during OFDM symbols 4, 11, . . . , 46 and so on, continuing in this manner until we get to AP #7, which would transmit on subcarriers 7, 14, . . . , 63 during OFDM symbols 1, 8, . . . , 50; on subcarriers 1, 8, . . . , 64 during OFDM symbols 2, 9, . . . , 45; on subcarriers 2, 9, . . . , 58 during OFDM symbols 3, 10, . . . , 45, etc.

By defining the TFI mapping this way, none of the seven APs transmits on the same sub-carrier at the same time, and all of the APs visit every sub-carrier multiple times during each narrowband transmission, so there are no holes.

Figure 22:
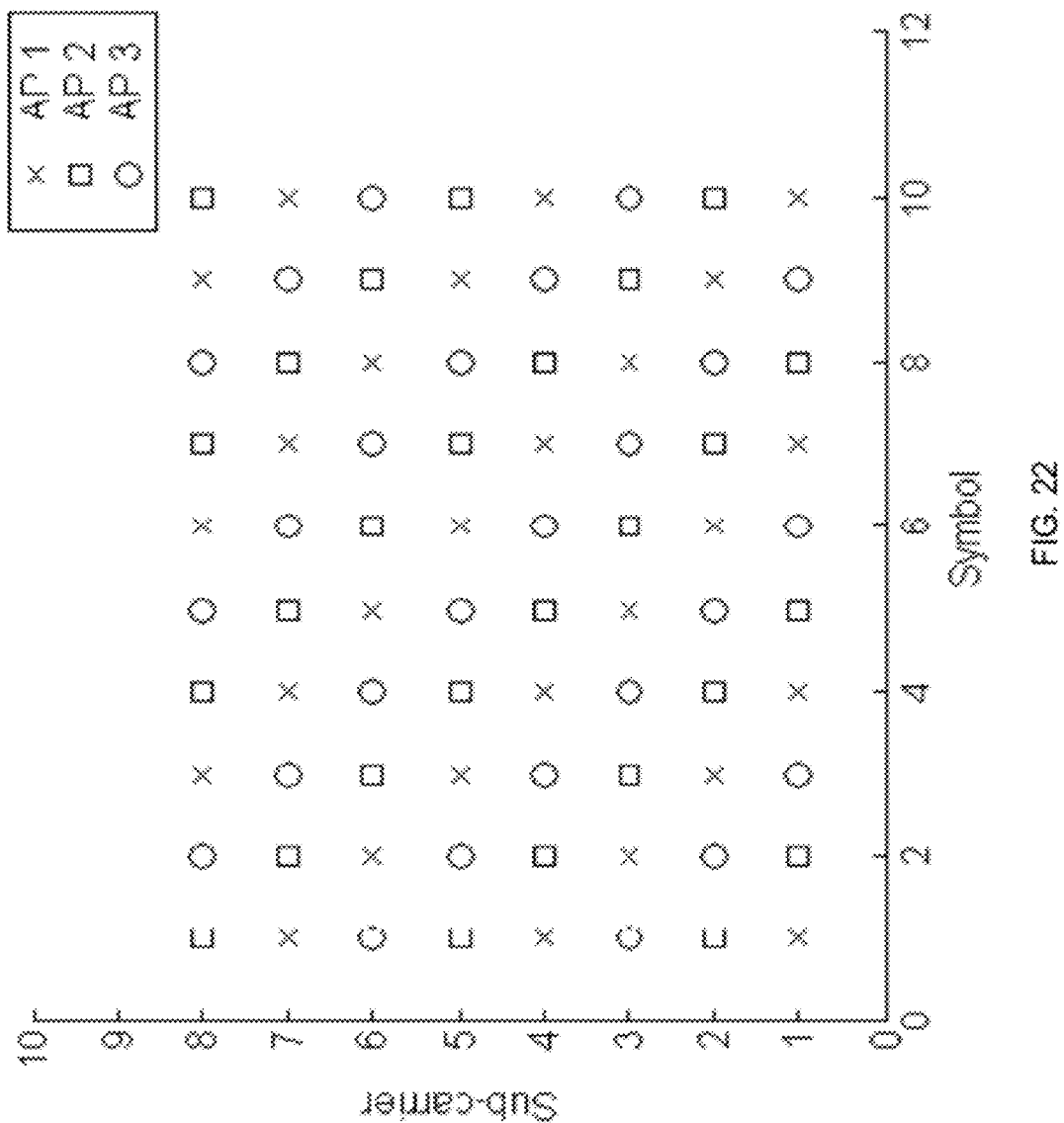
FIG. 22 is an exemplary plot showing an efficient OFDMA scheme in which transmissions from multiple Access Points are time-frequency interleaved in the same OFDM burst, in accordance with various embodiments.

FIG. 22 is an exemplary plot showing an efficient OFDMA scheme in which transmissions from multiple Access Points are time-frequency interleaved in the same OFDM burst, in accordance with various embodiments. FIG. 22 shows a simpler example of TFI in which 3 APs interleave their transmissions within OFDM bursts spanning 8 sub-carriers in frequency and 10 symbols in duration.

Multiplexing is also needed when the location estimate is performed on the network side in order to prevent TF-WB transmissions from multiple clients from interfering with other. This can be achieved in very much the same way as it was for the APs. Referring again to FIG. 21, each of the Clients in the network is assigned to transmit in the time slot immediately following the one assigned to the APs. Assuming there are N Clients for which periodic locating tracking by the network is enabled, a TFI scheme similar to the one described for the APs can be used, except it would be done using modulo N arithmetic on the subcarriers and OFDM symbols instead of modulo 7.

Multi-Input Receivers and Joint Time/Angle of Arrival Measurements

Nearly all IEEE 802.11n-compatible APs and some Clients are equipped with multi-input receivers, allowing them to receive, down-convert and digitize signals through up to 4 antenna paths simultaneously. A multi-input receiver can be leveraged to improve the accuracy of the ToA estimates in indoor environments. The improved performance comes from having additional uncorrelated (or loosely correlated) observations of the ToA through the new antenna paths.

If a multi-input receiver is used to receive a TF-WB signal, that receiver would down-convert, digitize and store each incoming narrowband transmission through each of its M antenna paths simultaneously. For ToA estimation, it would compute wideband observation waveforms and Wiener filters for each antenna path, and use the following formula to estimate the ToA, which is a generalization of the formula in Step 5 above for multiple antenna paths:

$$\hat{\tau}_0 = \underset{\tau_0}{\operatorname{argmin}} \sum_{m=1}^{M} \sum_{n} \frac{|y^{<m>}(nT) - \hat{x}(nT, \tau_0) * h^{<m>}(\tau_0)|^2}{\sigma_m^2} \quad (2)$$

where $y^{<m>}(nT)$ and $h^{<m>}(\tau_0)$ are the wideband observation waveform and Wiener filters, respectively, and $\sigma_m^2$ is the average noise power per sample in the mth antenna path. This can be shown to be a maximum-likelihood estimate for the ToA $\tau_0$ given the system model described herein. The estimator can be described in words as follows:

For each candidate ToA $\tau_0$
  For each antenna path m
    1. Compute the mean-square error (MSE) between the observed and model output waveforms for that candidate ToA,
    2. Normalize the MSE by the noise power in that antenna path,
    3. Sum normalized MSEs for each antenna path.

The ToA estimate $\hat{\tau}_0$ is the candidate $\tau_0$ with the lowest summed MSE.

It should be noted that the multi-input ToA estimator described above can be used to enhance the performance of any single-antenna path ToA estimator—not just one that uses TF-WB signaling. In other words, for any system that transmits a known reference waveform $\hat{x}(nT, \tau_0)$ through a multipath additive white Gaussian noise channel with propagation delay $\tau_0$ and receives through a multi-input receiver yielding observation waveforms $y^{<m>}(nT)$, m=1, . . . , M for each of the M antenna paths, the approach described above can be shown to provide the optimum ToA estimate.

In addition to improving the time-resolution of indoor time-of-arrival (ToA) measurements, TF-WB can also be used to improve the accuracy of indoor angle-of-arrival (AoA) measurements as well. A multi-input receiver is needed for AoA.

Figure 23:
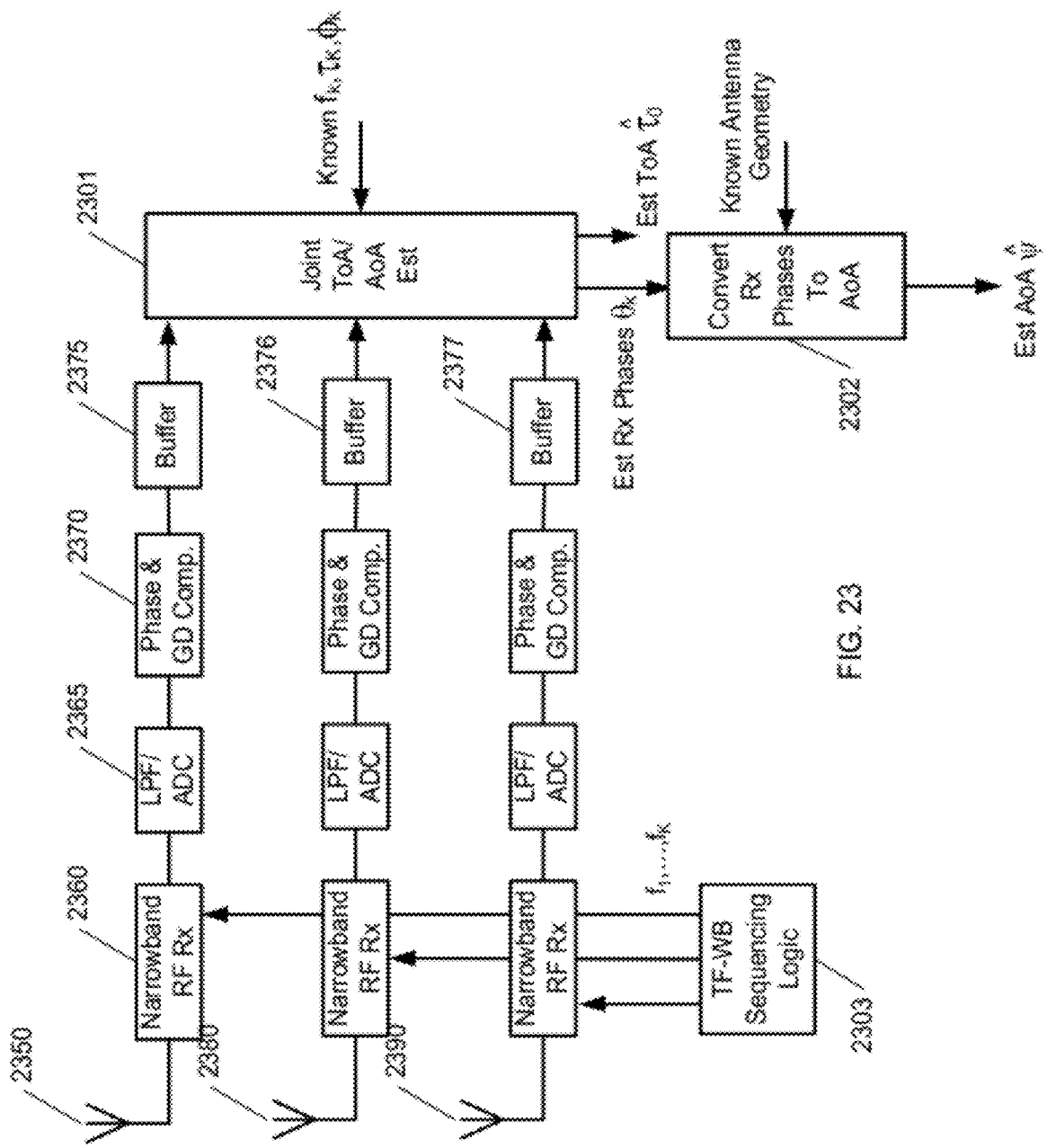
FIG. 23 is a schematic diagram of a 3-input TF-WB-capable receiver, in accordance with various embodiments.
Figures 24, 25, 26:
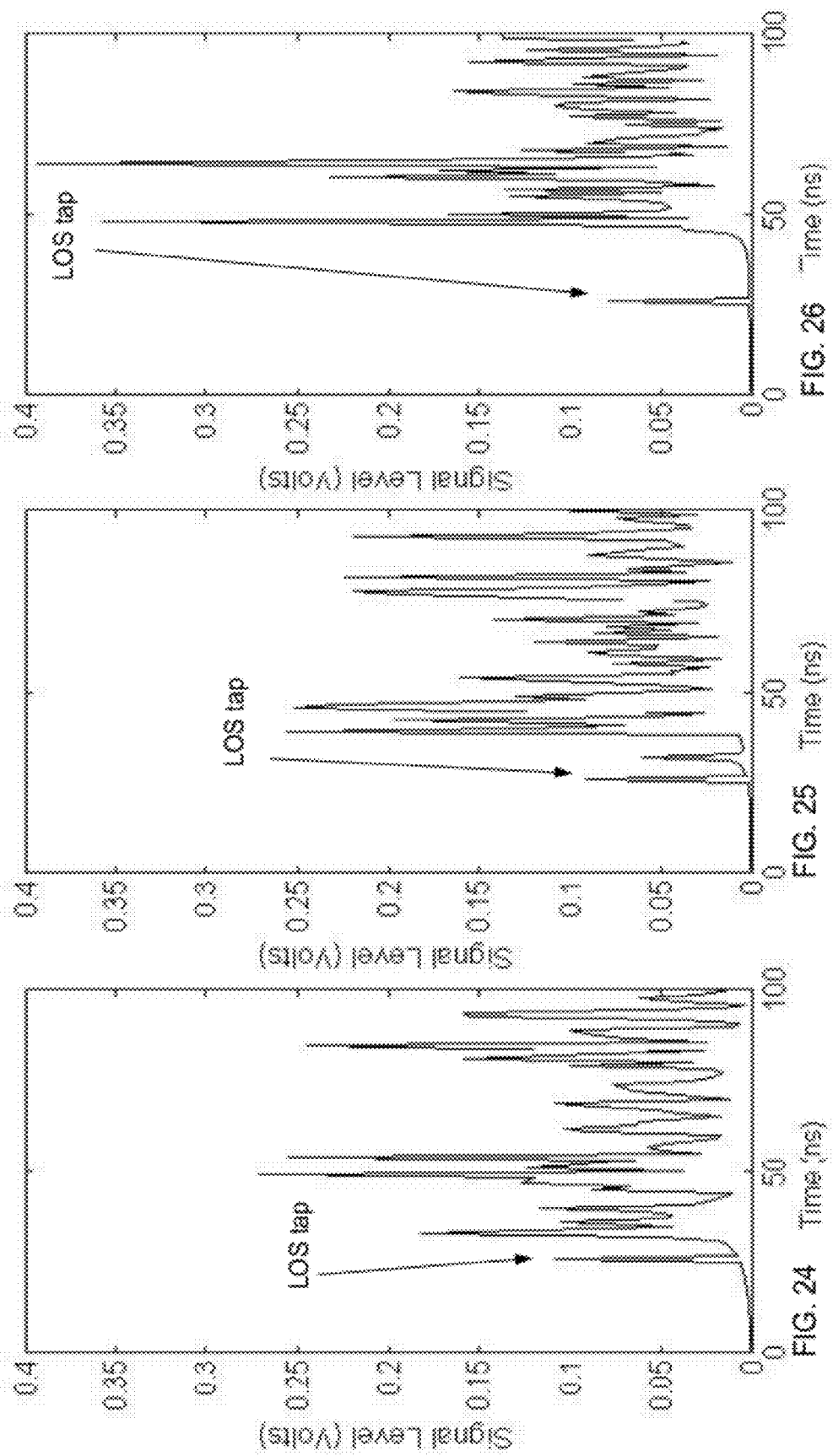
FIGS. 24-26 are exemplary plots that show Wiener filters for each of the 3 antenna paths from FIG. 23, in accordance with various embodiments.

FIG. 23 is a schematic diagram of a 3-input TF-WB-capable receiver, accordance with various embodiments. The received TF-WB signals from each antenna path are down-converted 2360, digitized 2365, adjusted for gain dependent group delay and phase shift 2370, and stored 2375-2377. To estimate the AoA 2301, one first finds the ToA of the received TF-WB signals using equation (2) above, then estimates the phase angle of the incoming transmission on each antenna path by computing the phase angle of Wiener filter at the tap corresponding to the LOS path. This is illustrated in FIGS. 24-26. FIGS. 24-26 are exemplary plots that show Wiener filters for each of the 3 antenna paths from FIG. 23, in accordance with various embodiments.

Returning to FIG. 23, the three phase angles computed in this step can then be converted into an AoA estimate 2302 based on the physical geometry of the antennas. The advantage of using TF-WB signaling for the AoA measurements is multipath suppression. The high time resolution allows the Wiener filter to discriminate the LOS from other paths, so the phase angle we see is the phase of the signal coming in the direction of the LOS path only—not other paths. For lower bandwidth signals, the LOS path would be summed with multipath reflections from other paths, yielding distorted phase estimates.

Receiver Calibration

Most digital receivers use some sort of automatic gain control (AGC) to adjust their received signal level entering the analog-to-digital converter (ADC). The gain control circuit is often implemented as a set of variable gain amplifiers (VGAs) in series that can be either switched on and off depending on the value of an input gain control word. When a VGA stage is turned on vs. off, it can create a carrier phase and/or group delay change. If the receiver changes its AGC setting to receive the narrowband transmissions at different frequencies, the phase shifts and group delay changes will create distortion in the received waveforms.

Fortunately, these phase and group delay vs. Rx gain variations don't change much across time and temperature, so they can be calibrated (i.e., measured at the time of manufacturing), stored in a table, and compensated for during data digitization and data storage. This is the purpose of block 1275 in FIG. 12.

TF-WB Receiver System

Referring to FIG. 12, a system for calculating the time of arrival of a wireless signal through a wireless channel includes receiver device 1200. Receiver device 1200 can include, but is not limited to, an access point, a smartphone, a laptop computer, or a wireless smart tag. Receiver device 1200 can include hardware, software, or a combination of hardware and software.

Receiver device 1200 receives a sequence of two or more signals representing two or more data packets transmitted through a wireless channel. The two or more signals are a result of two or more transmissions that are made sequentially in time at different center frequencies in order to span a desired. At least one of the two or more signals includes a physical layer preamble.

Receiver device 1200 calculates a time of arrival of one or more signals of the received sequence using one or more of the received sequence, the time differences among the two or more transmissions, the different center frequencies, information from the two or more data packets, and any carrier phase differences among the two or more transmissions In various embodiments, the time differences among the two or more transmissions and any carrier phase differences among the two or more transmissions are known to receiver device 1200 before the received sequence is transmitted.

In various embodiments, the transmission time of each of the two or more signals is encoded and included in the two or more data packets before transmission through the wireless channel. Receiver device 1200 determines the time differences among the two or more transmissions by decoding and subtracting the encoded transmissions of two or more consecutive data packets of the two or more data packets.

In various embodiments, transmission time differences among each of the two or more signals are encoded and included in the two or more data packets before transmission through the wireless channel. Receiver device 1200 determines the time differences among the two or more transmissions by decoding the encoded transmission time differences from the two or more data packets.

In various embodiments, the carrier phase of each of the two or more transmitted signals is encoded and included in the two or more data packets before transmission through the wireless channel. Receiver device 1200 determines any carrier phase differences among the two or more transmissions by decoding and subtracting the encoded carrier phase from the two or more data packets.

In various embodiments, carrier phase differences among each of the two or more transmitted signals are encoded and included in the two or more data packets before transmission through the wireless channel. Receiver device 1200 determines any carrier phase differences among the two or more transmissions by decoding the encoded carrier phase differences from the two or more data packets.

The two or more data packets are different data packets, for example. In various embodiments, the two or more data packets are the same data packets.

In various embodiments, the two or more data packets conform to the IEEE 802.11 (Wi-Fi™) standard, the Bluetooth™ standard, or the Global System for Mobile Communications (GSM) standard.

In various embodiments, the sequence represents a signal with a bandwidth that is at least twice as large as the bandwidth of one or more signals of the sequence.

In various embodiments, receiver device 1200 calculates an angle of arrival of one or more signals of the received sequence by receiving the sequence through two or more antenna paths simultaneously and using one or more of the received sequence, the time differences among the two or more transmissions, any carrier phase differences among the two or more transmissions, information from the two or more data packets, and the geometry of the two or more antennas.

In various embodiments, receiver device 1200 further calculates a location of receiver device 1200 using the time of arrival and one or more time of arrivals calculated from one or more received sequences that are transmitted from one or more additional locations. In various embodiments, time division multiple access (TDMA), orthogonal frequency-division multiple access (OFDMA), frequency division multiple access (FDMA) or code division multiple access (CDMA) is used to differentiate the received sequence and the one or more additional received sequences at the receiver device.

In various embodiments, the location of receiver device 1200 is calculated periodically and displayed periodically on a floor map.

In various embodiments, the received sequence and the one or more received sequences include parametric information that receiver device 1200 uses to calculate a location of receiver device 1200. In various embodiments, the parametric information includes one or more of coordinates for the locations of the devices that transmitted the received sequence and the one or more received sequences, number, time duration, and center frequencies of signal transmissions per location beacon for the received sequence and the one or more received sequences, or nominal start time for a first location beacon relative to a beacon time for the received sequence and the one or more received sequences.

In various embodiments, receiver device 1200 further receives a calibration sequence of two or more calibration signals before receiving the sequence. Receiver device 1200 uses the calibration sequence to construct a calibration table storing measured changes in group delay and phase shift over a set of receiver gain settings and/or RF center frequencies. Receiver device 1200 later uses the calibration table contents in its time-of-arrival and/or angle-of-arrival calculations.

In various embodiments, receiver device 1200 further sends a response sequence of two or more response signals representing two or more response data packets to a device from which the sequence was received and embeds in the two or more response data packets a turn-around-time so that the device calculates a distance between receiver device 1200 and the device using the turn-around-time. The turn-around-time include a difference between a first time of the receipt of the first signal in the sequence at an antenna of the receiver device and a second time of the beginning of the response sequence's beacon at an antenna of receiver device 1200.

In various embodiments, at least one additional receiver device is included in the system that receives the transmitted sequence and calculates one additional time of arrival for the received sequence. The time of arrival and the one more additional time of arrival are used to calculate a location of a device that transmitted the received sequence.

TF-WB Receiver Method

Figure 27:
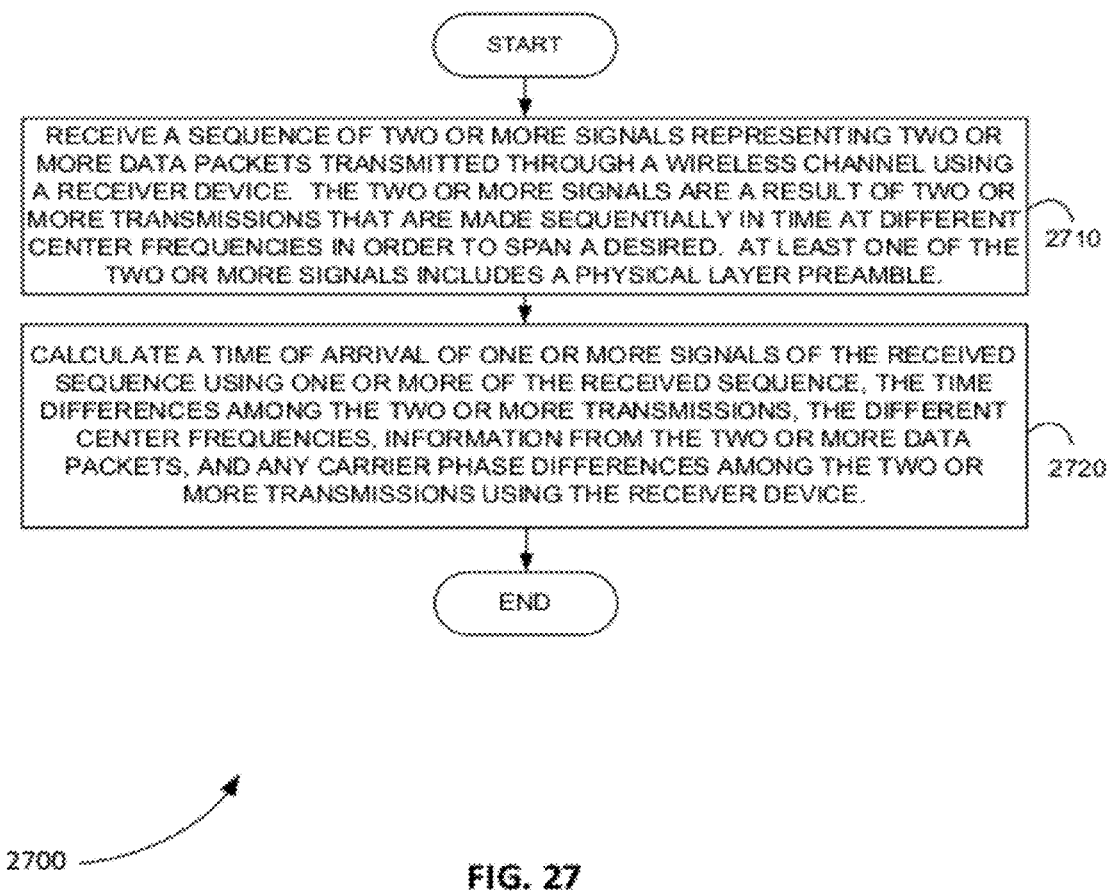
FIG. 27 is an exemplary flowchart showing a method for calculating the time of arrival of a wireless signal through a wireless channel using a receiver device, in accordance with various embodiments.

FIG. 27 is an exemplary flowchart showing a method 2700 for calculating the time of arrival of a wireless signal through a wireless channel using a receiver device, in accordance with various embodiments.

In step 2710 of method 2700, a sequence of two or more signals representing two or more data packets transmitted through a wireless channel is received using a receiver device. The two or more signals are a result of two or more transmissions that are made sequentially in time at different center frequencies in order to span a desired. At least one of the two or more signals includes a physical layer preamble.

In step 2720, a time of arrival of one or more signals of the received sequence is calculated using one or more of the received sequence, the time differences among the two or more transmissions, the different center frequencies, information from the two or more data packets, and any carrier phase differences among the two or more transmissions using the receiver device.

TF-WB Receiver Computer Program Product

In various embodiments, a computer program product includes a tangible computer-readable storage medium whose contents include a program with instructions being executed on a processor so as to perform a method for calculating the time of arrival of a wireless signal through a wireless channel. This method is performed by a system that includes one or more distinct software modules, for example.

Figure 28:
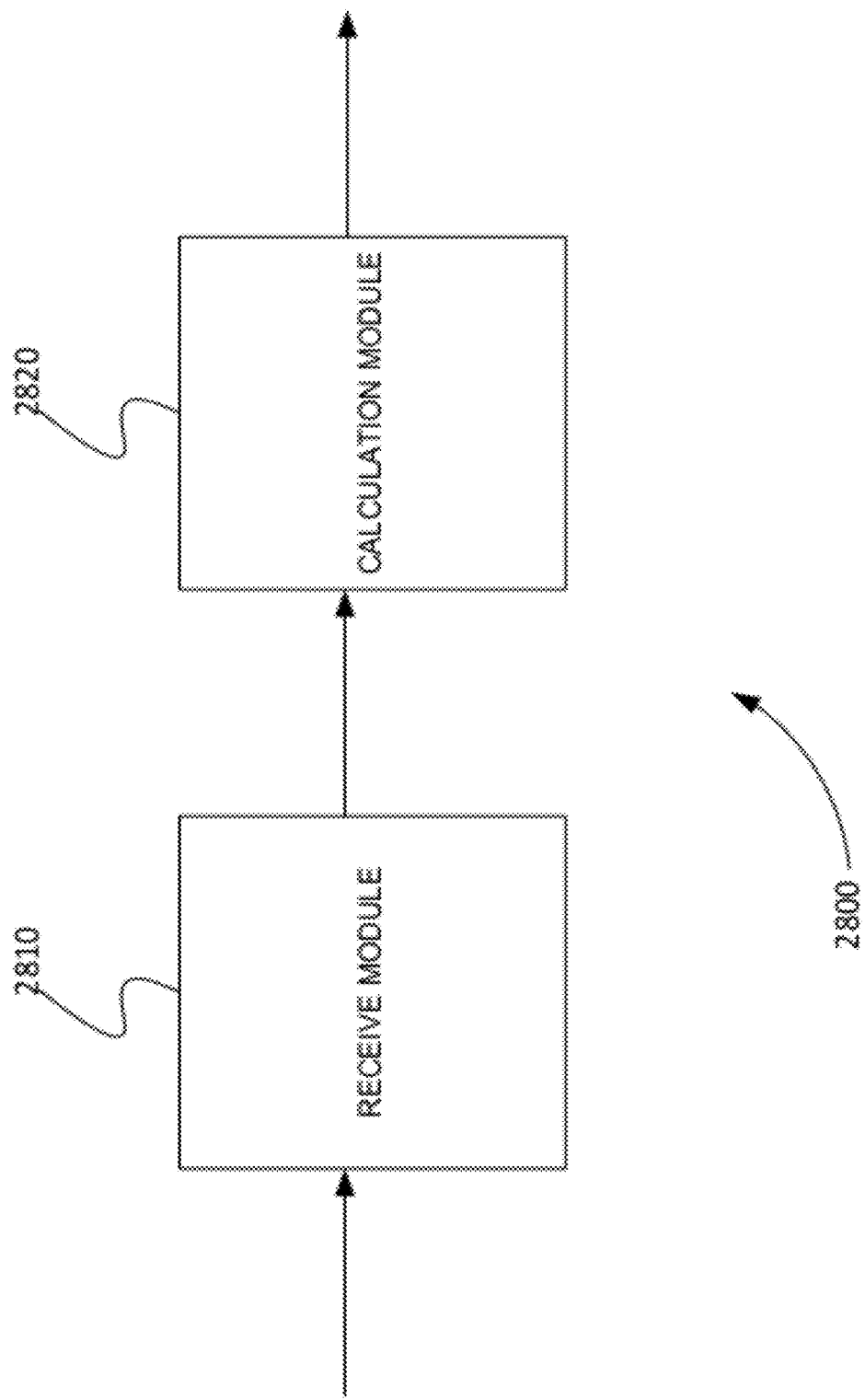
FIG. 28 is a schematic diagram of a system that includes a receive module and a calculation module that performs a method for calculating the time of arrival of a wireless signal through a wireless channel, in accordance with various embodiments.

FIG. 28 is a schematic diagram of a system 2800 that includes a receive module 2810 and a calculation module 2820 that performs a method for calculating the time of arrival of a wireless signal through a wireless channel, in accordance with various embodiments.

Receive module 2810 receives a sequence of two or more signals representing two or more data packets transmitted through a wireless channel. The two or more signals are a result of two or more transmissions that are made sequentially in time at different center frequencies in order to span a desired. At least one of the two or more signals includes a physical layer preamble.

Calculation module 2820 calculates a time of arrival of one or more signals of the received sequence using one or more of the received sequence, the time differences among the two or more transmissions, the different center frequencies, information from the two or more data packets, and any carrier phase differences among the two or more transmissions.

TF-WB Transmitter System

Referring to FIG. 10, a system for calculating the time of arrival of a wireless signal through a wireless channel includes transmitter device 1000. Transmitter device 1000 can include, but is not limited to, an access point, a smartphone, a laptop computer or a wireless smart tag. Transmitter device 1000 can include hardware, software, or a combination of hardware and software.

Transmitter device 1000 transmits a sequence of two or more signals representing two or more data packets through a wireless channel. The two or more signals are transmitted using two or more transmissions that are made sequentially in time at different center frequencies in order to span a desired bandwidth. At least one of the two or more signals includes a physical layer preamble. The sequence is received by a receiver device. A time of arrival of one or more signals of the received sequence is calculated by the receiver device using one or more of the received sequence, the time differences among the two or more transmissions, the different center frequencies, information from the two or more data packets, and any carrier phase differences among the two or more transmissions.

TF-WB Transmitter Method

Figure 29:
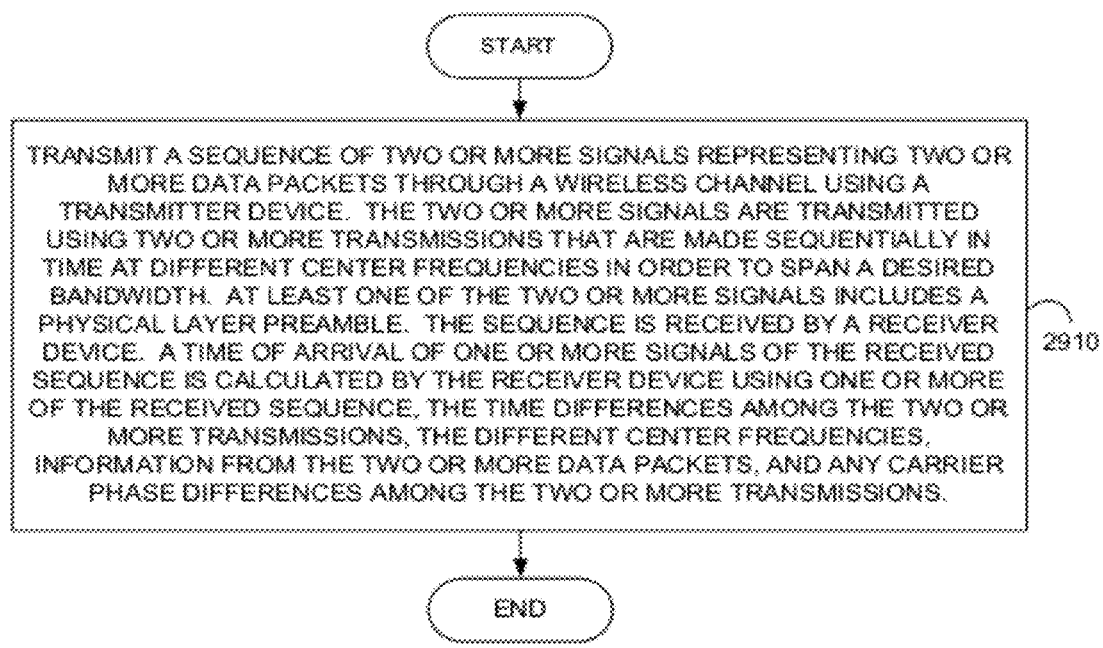
FIG. 29 is an exemplary flowchart showing a method for calculating the time of arrival of a wireless signal through a wireless channel using a transmitter device, in accordance with various embodiments.

FIG. 29 is an exemplary flowchart showing a method 2900 for calculating the time of arrival of a wireless signal through a wireless channel using a transmitter device, in accordance with various embodiments.

In step 2910 of method 2900, a sequence of two or more signals representing two or more data packets is transmitted through a wireless channel using a transmitter device. The two or more signals are transmitted using two or more transmissions that are made sequentially in time at different center frequencies in order to span a desired bandwidth. At least one of the two or more signals includes a physical layer preamble. The sequence is received by a receiver device. A time of arrival of one or more signals of the received sequence is calculated by the receiver device using one or more of the received sequence, the time differences among the two or more transmissions, the different center frequencies, information from the two or more data packets, and any carrier phase differences among the two or more transmissions.

TF-WB Transmitter Computer Program Product

In various embodiments, a computer program product includes a tangible computer-readable storage medium whose contents include a program with instructions being executed on a processor so as to perform a method for calculating the time of arrival of a wireless signal through a wireless channel. This method is performed by a system that includes one or more distinct software modules, for example.

FIG. 30 is a schematic diagram of a system 3000 that includes a transmit module 3010 that performs a method for calculating the time of arrival of a wireless signal through a wireless channel, in accordance with various embodiments. Transmit module 3010 transmits a sequence of two or more signals representing two or more data packets through a wireless channel. The two or more signals are transmitted using two or more transmissions that are made sequentially in time at different center frequencies in order to span a desired bandwidth. At least one of the two or more signals includes a physical layer preamble. The sequence is received by a receiver device. A time of arrival of one or more signals of the received sequence is calculated by the receiver device using one or more of the received sequence, the time differences among the two or more transmissions, the different center frequencies, information from the two or more data packets, and any carrier phase differences among the two or more transmissions.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for calculating the time of arrival of a wireless signal through a wireless channel, comprising:
a receiver device that
receives a sequence of two or more data packets transmitted through a wireless channel, wherein the two or more data packets are a result of two or more transmissions that are made sequentially in time at different center frequencies in order to span a desired bandwidth and wherein each data packet of the two or more data packets includes a physical layer preamble and is transmitted at a single center frequency, and
calculates a time of arrival of one or more data packets in the received sequence using each data packet of the received sequence and one or more of the time differences among the two or more transmissions, the different center frequencies, and any carrier phase differences among the two or more transmissions.

2. The system of claim 1, wherein said time differences among the two or more transmissions and said any carrier phase differences among the two or more transmissions are known to the receiver device before the received sequence is transmitted.

3. The system of claim 1, wherein a transmission time of each of the two or more data packets is encoded and included in the two or more data packets before transmission through the wireless channel and the receiver device determines said time differences among the two or more transmissions by decoding and subtracting the encoded transmission times of two or more consecutive data packets of the two or more data packets.

4. The system of claim 1, wherein transmission time differences among each of the two or more data packets are encoded and included in the two or more data packets before transmission through the wireless channel and the receiver device determines said time differences among the two or more transmissions by decoding the encoded transmission time differences from the two or more data packets.

5. The system of claim 1, wherein a carrier phase of each of the two or more transmissions is encoded and included in the two or more data packets before transmission through the wireless channel and the receiver device determines said any carrier phase differences among the two or more transmissions by decoding and subtracting the encoded carrier phase from the two or more data packets.

6. The system of claim 1, wherein carrier phase differences among each of the two or more transmissions are encoded and included in the two or more data packets before transmission through the wireless channel and the receiver device determines said any carrier phase differences among the two or more transmissions by decoding the encoded carrier phase differences from the two or more data packets.

7. The system of claim 1, wherein the two or more data packets are different data packets.

8. The system of claim 1, wherein the two or more data packets are the same data packets.

9. The system of claim 1, wherein the two or more data packets conform to the IEEE 802.11 (Wi-Fi™) standard.

10. The system of claim 1, wherein the two or more data packets conform to the Bluetooth™ standard.

11. The system of claim 1, wherein the two or more data packets conform to the Global System for Mobile Communications (GSM) standard.

12. The system of claim 1, wherein the receiver device calculates an angle of arrival of one or more data packets of the received sequence by receiving the sequence through two or more antenna paths simultaneously and using one or more of the received sequence, said time differences among the two or more transmissions, said any carrier phase differences among the two or more transmissions, information from the two or more data packets, and the geometry of the two or more antennas.

13. The system of claim 1, wherein the receiver device further calculates a location of the receiver device using the time of arrival and one or more time of arrivals calculated from one or more received sequences that are transmitted from one or more additional locations.

14. The system of claim 13, wherein time division multiple access (TDMA) is used to differentiate the received sequence and the one or more additional received sequences at the receiver device.

15. The system of claim 13, wherein orthogonal frequency-division multiple access (OFDMA) is used to differentiate the received sequence and the one or more additional received sequences at the receiver device.

16. The system of claim 13, wherein frequency division multiple access (FDMA) or code division multiple access (CDMA) is used to differentiate the received sequence and the one or more additional received sequences at the receiver device.

17. The system of claim 13, wherein the received sequence and the one or more received sequences include parametric information that the receiver device uses to calculate a location of the receiver device.

18. The system of claim 17, wherein parametric information comprises one or more of coordinates for the locations of the devices that transmitted the received sequence and the one or more received sequences, number, time duration, and center frequencies of transmissions per location beacon for the received sequence and the one or more received sequences, or nominal start time for a first location beacon relative to a beacon time for the received sequence and the one or more received sequences.

19. The system of claim 1, wherein the receiver device further receives a calibration sequence of two or more calibration data packets before receiving the sequence, which the receiver device uses to construct a calibration table storing measured changes in group delay and phase shift over a set of receiver gain settings and/or RF center frequencies, and later uses the calibration table contents in time-of-arrival and/or angle-of-arrival calculations.

20. The system of claim 1, wherein the receiver device further sends a response sequence of two or more response data packets to a device from which the sequence was received and embeds in the two or more response data packets a turn-around-time so that the device calculates a distance between the receiver device and the device using the turn-around-time, wherein the turn-around-time comprises a difference between a first time of the receipt of the first data packets in the sequence at an antenna of the receiver device and a second time of the beginning of the response sequence's beacon at an antenna of the receiver device.

21. The system of claim 1, further comprising at least one additional receiver device that receives the transmitted sequence and calculates one additional time of arrival for the received sequence, wherein the time of arrival and the one more additional time of arrival are used to calculate a location of a device that transmitted the received sequence.

22. A system for calculating the time of arrival of a wireless signal through a wireless channel, comprising:
a transmitter device that
transmits a sequence of two or more data packets through a wireless channel,
wherein the two or more data packets are transmitted using two or more transmissions that are made sequentially in time at different center frequencies in order to span a desired bandwidth, wherein each data packet of the two or more data packets includes a physical layer preamble and is transmitted at a single center frequency, wherein a sequence is received by a receiver device, and wherein a time of arrival of one or more data packets of the received sequence is calculated by the receiver device using each data packet of the received sequence and one or more of the time differences among the two or more transmissions, the different center frequencies, and any carrier phase differences among the two or more transmissions.

23. A method for calculating the time of arrival of a wireless signal through a wireless channel, comprising:
receiving a sequence of two or more data packets transmitted through a wireless channel using a receiver device, wherein the two or more data packets are a result of two or more transmissions that are made sequentially in time at different center frequencies in order to span a desired bandwidth and wherein each data packet of the two or more data packets includes a physical layer preamble and is transmitted at a single center frequency, and
calculating a time of arrival of one or more data packets in the received sequence using each data packet of the received sequence and one or more of the time differences among the two or more transmissions, the different center frequencies, and any carrier phase differences among the two or more transmissions using the receiver device.

24. A method for calculating the time of arrival of a wireless signal through a wireless channel, comprising:
transmitting a sequence of two or more data packets through a wireless channel using a transmitter device, wherein the two or more data packets are transmitted using two or more transmissions that are made sequentially in time at different center frequencies in order to span a desired bandwidth, wherein each data packet of the two or more data packets includes a physical layer preamble and is transmitted at a single center frequency, wherein a sequence is received by a receiver device, and wherein a time of arrival of one or more data packets of the received sequence is calculated by the receiver device using each data packet of the received sequence and one or more of the time differences among the two or more transmissions, the different center frequencies, and any carrier phase differences among the two or more transmissions.

* * * * *